United States Patent
Morita et al.

[11] Patent Number: 6,144,441
[45] Date of Patent: *Nov. 7, 2000

[54] IMAGE RECORDING APPARATUS AND A LIGHT-SENSITIVE MATERIAL DISTRIBUTING DEVICE FOR USE THEREIN

[75] Inventors: Naoyuki Morita; Yoshiyuki Tsuzawa, both of Kanagawa, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/048,258

[22] Filed: Mar. 26, 1998

[30] Foreign Application Priority Data

| Mar. 26, 1997 | [JP] | Japan | 9-073169 |
| Jun. 4, 1997 | [JP] | Japan | 9-146331 |
| Jul. 23, 1997 | [JP] | Japan | 9-197047 |

[51] Int. Cl.[7] ............ G03B 29/00; G03B 27/32; G03B 27/52
[52] U.S. Cl. ............ 355/29; 355/27; 355/40
[58] Field of Search ............ 355/27–29, 39, 355/40, 50; 347/176, 212, 213; 358/474, 505; 271/258.01, 265.01, 302; 396/612, 620

[56] References Cited

U.S. PATENT DOCUMENTS

| 4,924,261 | 5/1990 | Okino | 355/35 |
| 4,968,997 | 11/1990 | Saitoh et al. | 346/136 |
| 4,969,016 | 11/1990 | Kudoh | 355/310 |
| 5,559,585 | 9/1996 | Takagi | 355/228 |
| 5,594,525 | 1/1997 | Benker et al. | 355/29 |
| 5,663,755 | 9/1997 | Wada et al. | 347/176 |
| 5,708,903 | 1/1998 | Kashino et al. | 396/568 |
| 5,713,504 | 2/1998 | Arai et al. | 226/183 |
| 5,835,839 | 11/1998 | Kaneda | 399/361 |

*Primary Examiner*—Safet Metjahic
*Assistant Examiner*—Hung Henry Nguyen
*Attorney, Agent, or Firm*—Birch, Stewart, Kolasch & Birch, LLP

[57] ABSTRACT

The improved image recording apparatus includes a light-sensitive material supply section having a loader of a magazine containing a roll of a light-sensitive material in a lightproof case and a withdrawing device for withdrawing the light-sensitive material from the magazine; a cutter for cutting the light-sensitive material into sheets; an image recording section which has a scanning transport device for transporting the cut sheets of light-sensitive material for scanning and an exposing device by which the light-sensitive material is exposed to recording light modulated in accordance with digital image data; a transport device which transports the light-sensitive material from the cutter to the scanning transport device and which transports the as-exposed light-sensitive material to a next step; and a back printing section which is provided midway along the path of transport of the light-sensitive material by the transport device to record a back print on the non-recording side of the light-sensitive material. Besides the reduction in the cost of print preparation due to the improved throughput of the processor, the distributing device of the invention offers the advantage of reducing the cost of the image recording apparatus to a lower level than has been achieved by using the conventional distributing device.

15 Claims, 13 Drawing Sheets

IMAGE RECORDING APPARATUS AND A LIGHT-SENSITIVE MATERIAL DISTRIBUTING DEVICE FOR USE THEREIN

BACKGROUND OF THE INVENTION

This invention relates to the technical field of a digital image recording apparatus and a light-sensitive material distributing device which is to be used in an image recording apparatus that exposes light-sensitive materials to record a latent image.

Heretofore, the image recorded on photographic films such as negatives and reversals (which are hereunder referred to simply as "films") has been commonly printed on light-sensitive materials such as photographic paper by means of direct (analog) exposure, in which projected light from the film is allowed to be incident on the light-sensitive material to achieve its areal exposure.

A new technology has recently been introduced and this is a printer that relies upon digital exposure. Briefly, the image recorded on a film is read photoelectrically, converted to a digital signal and subjected to various image processing operations to produce image data for recording purposes; recording light that has been modulated in accordance with the image data is used to scan and expose a light-sensitive material to record a latent image, which is subsequently developed and output as a print (photograph). The printer operating on this principle has been commercialized as a digital photoprinter.

In the digital photoprinter, the image on a film is read photoelectrically and gradation correction and other operations are performed by subsequent image (signal) processing to determine exposing conditions. Hence, the digital photoprinter has many capabilities in image processing such as editing of printed images by, for example, assembling a plurality of images or splitting a single image into plural images, as well as color/density adjustment and edge enhancement; as a result, prints can be output after various image processing operations have been performed in accordance with specific uses. In addition, the data on a printed image can be supplied into a computer or the like and stored in recording media such as a floppy disk.

A further advantage of the digital photoprinter is that compared to the prints produced by the conventional method of direct exposure, those which are output by the digital photoprinter have better image quality in such aspects as resolution and color/density reproduction.

Having these features, the digital photoprinter is basically composed of an input machine having a scanner (image reader) and an image processor and an output machine having both an exposing device and a developing device.

In the scanner, reading light issuing from a light source is allowed to be incident on a film, from which projected light carrying the image recorded on the film is produced and focused by an imaging lens to form a sharp image on an image sensor such as a CCD sensor, the image being then captured by photoelectric conversion and sent to the image processor as data for the image on the film (i.e., the image data signal). In the image processor, the image data sent from the scanner are subjected to specified image processing operations and the resulting output image data for image recording (i.e., exposing conditions) are sent to the exposing device.

In the exposing device, if it is of a type that relies upon exposure by scanning with an optical beam, the latter is modulated in accordance with the image data sent from the image processor and deflected in a main scanning direction as the light-sensitive material (e.g. photographic paper) is transported in an auxiliary direction perpendicular to the main scanning direction, whereby a latent image is formed as the result of scan exposure (printing) of the light-sensitive material with the optical beam and a back print is also recorded. In the developing device (processor), the exposed light-sensitive material is subjected to development and other specified processing operations so as to output a print which reproduces the image that has been recorded on the film.

In the exposing device, whether it is in the digital photoprinter or an ordinary photoprinter that relies upon "direct" exposure, a virgin light-sensitive material is in the form of a magazine, i.e., a roll contained in a lightproof case. The light-sensitive material is withdrawn out of the magazine in the exposing device and further transported for exposure and other necessary steps.

In the ordinary photoprinter, the light-sensitive material being transported is not cut but remains a web as it is subjected to exposure, back print recording, development, rinse, drying and other necessary steps and only after these steps are complete, the light-sensitive material is cut to individual prints of a specified length.

This process requires that frame information (frame punches) for delineating individual frames (or prints) be formed before or after the exposure of the light-sensitive material. However, the portion of the light-sensitive material where the frame information is formed is simply a waste of space. In addition, frame information have to be formed by special means having a punch, a sensor or the like.

In the exposing device of a digital exposure type, the light-sensitive material in the process of exposure must be transported for scanning in high precision and without stops in order to record images of high quality that are free from unevenness and other defects. On the other hand, the transport of the light-sensitive material has to be stopped at the time of forming frame information and, in addition, the recording of back prints will fluctuate the load in the transport of the light-sensitive material for scanning.

In order to avoid these difficulties, the exposing device in the digital photoprinter is adapted to make a slack (loop) out of the light-sensitive material which is located not only between the exposing position and the frame information forming zone but also between the exposing position and the back print recording zone. If this approach is taken, the volume of the light-sensitive material in loop (the number of frames) must be controlled, the timing of exposure must be properly adjusted and there are many other factors including the complexity of the transport zone and in the control of the light-sensitive material; as a result, the equipment cost and the running cost increase inevitably.

Under the circumstances, an exposing device is desired that can be incorporated in a digital photoprinter and which is capable of exposing a light-sensitive material after it is cut to sheets corresponding to individual prints to be finally produced.

However, the digital exposing device which is capable of exposing a light-sensitive material after it is cut to sheets has not been actually realized yet.

With photoprinters, development and subsequent steps generally take more time than exposure. If exposure (image recording) is performed continuously in parallel with development and subsequent steps, the former outpaces the latter and the exposed but yet to be developed light-sensitive material gradually builds up. In other words, the development and subsequent steps are rate limiting and the exposing operation has to be stopped.

In photoprinters of a type that cuts the light-sensitive material into sheets in the last step, a reservoir is provided between the exposing section and the developing machine to store the exposed light-sensitive material temporarily. As a result, the development and subsequent steps are not rate limiting and continuous exposure can be accomplished to realize efficient processing.

In photoprinters of a type that performs exposure after the light-sensitive material is cut into sheets, the operating efficiency can be improved by accommodating the sheets of exposed light-sensitive material in a stocker or the like. However, this approach involves difficulty in the management of the order of exposing the cut sheets (by making reference to the frame number and by sorting), as well as in achieving smooth ejection of the sheets from the stocker or the like.

To overcome this difficulty, the cut sheets of the exposed light-sensitive material, before they are fed into the developing machine, are distributed sidewise, or in a direction perpendicular to the direction of their transport, to form a plurality of rows that overlap in the direction of transport. In this way, the throughput of the developing machine can be improved over the case where individual sheets of the light-sensitive material are processed in a single row (almost doubled in two rows and tripled in three rows) and the difference in speed between exposure and development processing is practically cancelled.

However, if a device that performs such distribution of the sheets of light-sensitive material is provided in a photoprinter, the pathlength over which the light-sensitive material is transported is increased and the size of the photoprinter and its cost will increase unavoidably.

Distribution of the cut sheets of light-sensitive material should not affect exposure and any other steps in the processing of the light-sensitive material. Take, for example, a photoprinter that has a capability for processing 1800 prints of the most common size per hour. Since one print is processed (exposed) every two seconds, the distributing device must accordingly complete the necessary operation consisting of the acceptance of incoming sheets of the exposed light-sensitive material, their distribution and making preparations for the acceptance of the next coming sheet.

In order to meet this requirement, the conventional distributing device is adapted to consist of three blocks, a high-speed transport block, a distributing block and a speed regulating block; in the high-speed transport block, the sheets of light-sensitive material emerging from the exposing section are transported into the distributing block at high speed so that the distance to the next coming sheet is long enough to secure the time necessary for performing the intended distribution and in the distributing block, the sheets are distributed sidewise by a suitable method such as moving the sheets together with the transport means and thereafter transported into the speed regulating block, where the transport speed of the sheets is adjusted to one that is compatible with development before they are fed into the developing machine.

As a result, compared to the case where no such distributing device is employed, the pathlength of the light-sensitive material is increased considerably and the size and cost of the photoprinter will increase accordingly.

SUMMARY OF THE INVENTION

A first object, therefore, of the present invention is to provide an image recording apparatus (exposing apparatus) for use in a digital photoprinter and the like that perform digital exposure, the recording of backprints and so forth on cut sheets of a light-sensitive material, the apparatus being characterized by good maintainability, ease in achieving machine grade-up and cost reduction, as well as compactness and high operating efficiency.

A second object of the invention is to provide a light-sensitive material distributing device which is to be used in an image recording apparatus (exposing apparatus) that performs exposure, preferably digital scan exposure, on cut sheets of a light-sensitive material and which feeds the exposed sheets of light-sensitive material into a developing machine, the device being characterized by short pathlength, small size and simple layout, as well as low cost and positiveness in distributing the exposed sheets of light-sensitive material into a plurality of rows in the image recording apparatus.

In order to achieve the first object, the invention provides an image recording apparatus comprising:

a light-sensitive material supply section having a loader of a magazine containing a roll of a light-sensitive material in a lightproof case and a withdrawing means for withdrawing the light-sensitive material from said magazine;

a cutter for cutting the light-sensitive material into sheets as it is withdrawn by said withdrawing means;

an image recording section that is positioned above said light-sensitive material supply section and which has a scanning transport means for transporting said cut sheets of light-sensitive material for scanning as they are held in a specified recording position and an exposing means by which the light-sensitive material being transported for scanning by said scanning transport means is exposed to recording light modulated in accordance with digital image data;

a transport means which transports the light-sensitive material from said cutter to said scanning transport means in such a way that its recording side faces up in said recording position and which transports the as-exposed light-sensitive material to a next step; and a back printing section which is provided midway the path of transport of the light-sensitive material by said transport means to record a back print on the non-recording side of the light-sensitive material.

In a preferred embodiment, the image recording apparatus of the invention further includes a distributing means downstream of said image recording section in the direction of transport of the light-sensitive material for distributing the cut sheets of light-sensitive material into a plurality of rows in a direction perpendicular to the transport by said transport means.

In order to achieve the second object, the invention provides a light-sensitive material distributing device for use in an image recording apparatus that exposes a light-sensitive material as sheets of a specified length to record a latent image and which supplies the as-exposed light-sensitive material into a developing machine, said device comprising a transport means for transporting the sheets of light-sensitive material as they are placed on it, and a lift distributing means which, after the sheets of the light-sensitive material have been transported to a specified position on said transport means, lifts said sheets of the light-sensitive material from the transport means and distributes them into a plurality of rows in a direction perpendicular to the transport by said transport means.

In a preferred embodiment, the exposure of the light-sensitive material in said image recording apparatus is scan exposure in which the light-sensitive material is exposed as it is transported by a scanning transport means and said transport means is provided immediately downstream of said scanning transport means in the direction of transport of the light-sensitive material.

In a further preferred embodiment, said transport means is inclined downward to the downstream end of the transport of the light-sensitive material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE INVENTION

The image recording apparatus according to the first aspect of the invention and the light-sensitive material distributing device according to its second aspect will now be described in detail with reference to the preferred embodiments shown in the accompanying drawings.

Figure 1A:
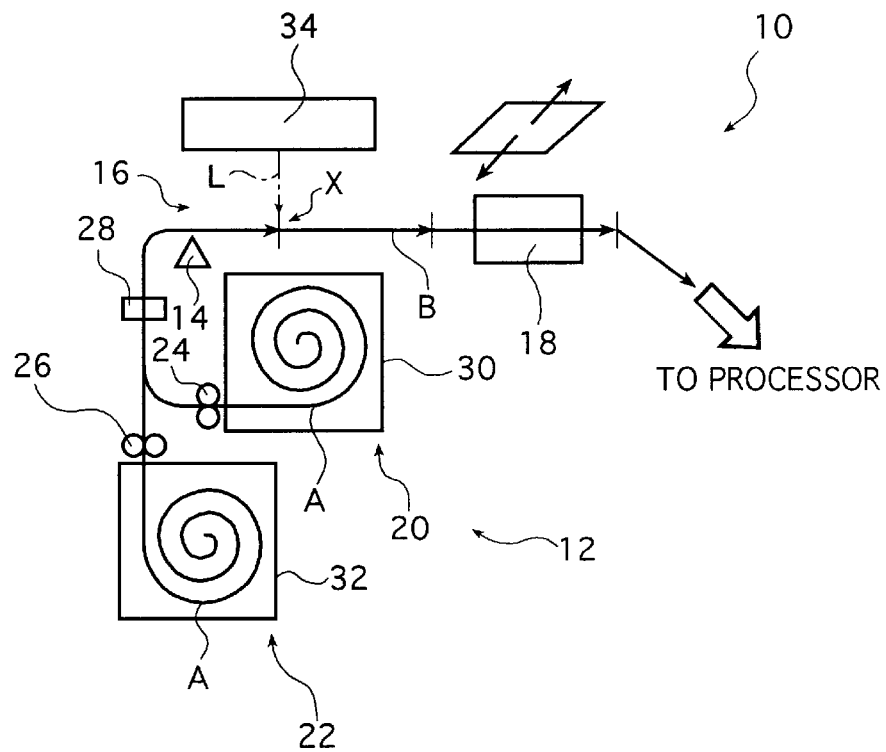
FIGS. 1A and 1B are conceptual diagrams showing the basic layouts of two examples of an image recording apparatus according to the first aspect of the invention.
Figure 1B:
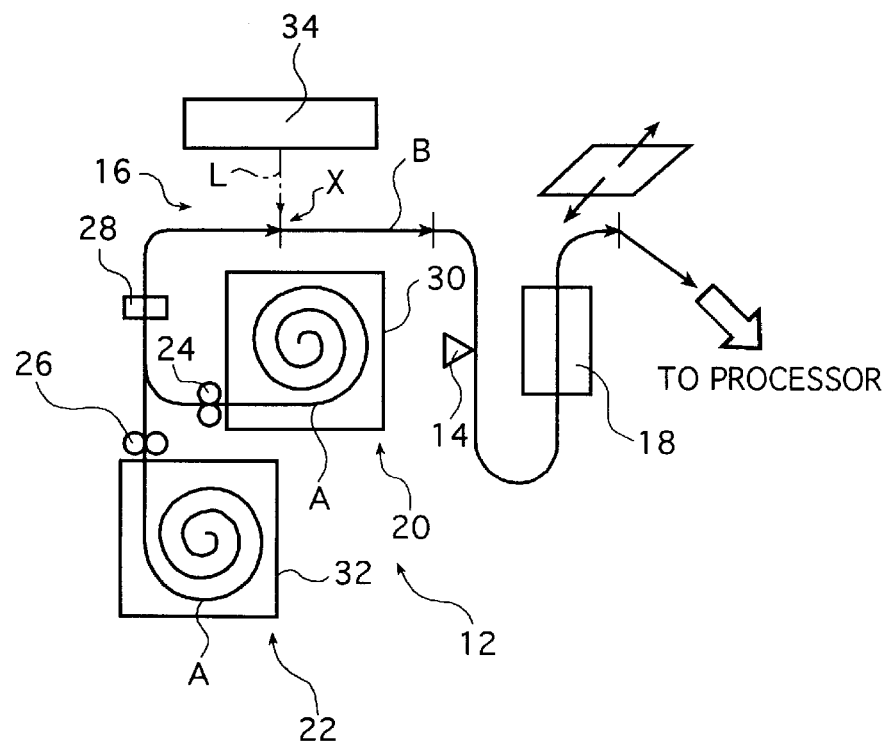

First, the image recording apparatus is described below with reference to FIGS. 1–6. FIGS. 1A and 1B show the basic layouts of two examples of the image recording apparatus. The image recording apparatus indicated by 10 in FIG. 1A and which is hereinafter simply referred to as the "recording apparatus" is such that a web of light-sensitive material is cut to individual sheets of a specified length associated with the prints to be finally produced and, after back printing (recording of a back print) and digital exposure, the exposed light-sensitive material A is supplied into a developing machine (also called "processor").

Having these capabilities, the recording apparatus 10 comprises a light-sensitive material supply section 12, a cutter 28, a printer 14 for recording a back print, an image recording section 16 having an exposing optical unit (hereinafter called "exposing unit") 34 which exposes the light-sensitive material A in a recording (exposing) position X and a scanning transport means (not shown in FIGS. 1A and 1B), and a distributing device 18.

As also shown in FIGS. 1A and 1B, the basic layout of the image recording apparatus 10 is such that the image recording section 16 is provided upstream of the light-sensitive material supply section 12 and that the light-sensitive material A is transported from the cutter 28 to the scanning transport means, with the recording side (emulsion coated side) facing up in the recording position X.

Needless to say, a means of transporting the light-sensitive material A, transport guides, various sensors and so forth are provided as required in the recording apparatus although they are omitted from FIGS. 1A and 1B in order to clarify the basic construction of the apparatus.

In the recording apparatus 10, the light-sensitive material supply section 12 comprises loaders 20 and 22 and associated withdrawing roller pairs 24 and 26. Cutter 28 for cutting the light-sensitive material A into sheets having a length associated with the print size is provided downstream in the direction of transport of the light-sensitive material A by means of the withdrawing roller pairs 24 and 26 (the term "downstream" as used hereinafter has the meaning just defined above).

The loader 20 (or 22) is a site at which a magazine 30 (or 32) containing a roll of light-sensitive material A in a lightproof case, with the recording side facing outward, is loaded. The magazines 30 and 32 to be loaded in the loaders 20 and 22 are usually adapted to contain different types of light-sensitive material A which is characterized by their size (width), surface gloss (silk-finish, matte and so forth), specifications (e.g., thickness and base type), and so forth.

The illustrated recording apparatus 10 is capable of loading with two magazines but this is not the sole case of the invention and it may be adapted to be capable of loading with only one magazine or three or more magazines.

The withdrawing roller pair 24 or 26 is operated to withdraw the light-sensitive material A from the magazine 30 or 32 in the loader 20 or 22, respectively, and transports it downward. The transport of the light-sensitive material A stops at the point of time when it has been transported downstream from the cutter 28 by a length corresponding to each of the prints to be produced. Subsequently, the cutter 28 turns on to cut the light-sensitive material A to individual sheets of a specified length.

The recording apparatus 10 shown in FIGS. 1A and 1B is adapted to be such that the light-sensitive material A withdrawn from the two magazines is cut with the common single cutter 28; this is not the sole case of the invention and two separate cutters may be provided for the respective loaders (or magazines).

The printer 14 is used to record on a non-recording reverse side of the light-sensitive material A (where no emulsion is coated), a back print consisting of various pieces of information, such as the date when the picture was taken, the date of printing (exposure), frame number, film identification (ID) number (code), ID number of the camera used to take the picture and ID number of the photoprinter.

In the recording apparatus 10 of the invention, there are no particular limitations on the printer 14 to record a back print and various back print recording methods used with known photoprinters may be employed, as exemplified by an ink-jet printer, a dot impact printer and a thermal transfer printer. For the reason to be described late, a non-impact recording method such as the one used with an ink-jet printer may be employed with advantage and a particularly preferred printer is an ink-jet printer that uses a heat-fusible ink that is water-insoluble and which is solid at ordinary temperatures.

To be compatible with the recently developed Advanced Photo System, the printer 14 is preferably adapted to be capable of marking at least two lines at a time.

If back printing is to be done in the recording apparatus 10 of the invention before the exposure of the light-sensitive material A as shown in FIG. 1A, a back print may be recorded prior to or after the cutting of the light-sensitive material A with the cutter 28 or it may be recorded for a duration of time that spans the start and end of the cutting operation. Which timing to choose depends on various factors such as the distance from the cutter 28 to the area where a back print is recorded with the printer 14 and the size of the print to be eventually produced.

The image recording section 16 is composed of the exposing unit 34 and the scanning transport means (not shown in FIGS. 1A and 1B) and, in the image recording apparatus 10 of the invention, the image recording section 16 is provided above the aforementioned light-sensitive material supply section 12. An electronic section containing the control board for the recording apparatus 10 is usually provided in the neighborhood of the image recording section 16 and by providing it above the light-sensitive material supply section 12, the recording apparatus 10 is adapted to have better maintainability.

In the image recording section 16 of the illustrated recording apparatus 10, the cut sheets of light-sensitive material A are transported for scanning by the scanning transport means as they are held in the recording position X and recording light L modulated in accordance with digital image data is projected by the exposing unit 34 to be incident on the light-sensitive material A in the recording position X to perform two-dimensional exposure. This method of exposure is generally referred to as "digital raster scan exposure" and used to record an image on the light-sensitive material A.

The exposing unit 34 is a known optical beam scanner that is composed essentially of light sources which issue optical beams for exposing the light-sensitive material A with red (R), green (G) and blue (B) lights, a modulating means such as AOM (acoustic optical modulator) which modulates the issued light beams in accordance with digital image data, a light deflector such as a polygonal mirror which deflects the modulated light beams in a main scanning direction which is perpendicular to the direction in which the light-sensitive material A is transported for scanning, and an fθ (scanning) lens with which the deflected light beams are focused to the specified beam spots at a specified point in the recording position X (on the scanning line).

The exposing unit 34 used in the recording apparatus of the invention is by no means limited to this known type of optical beam scanner and it may be replaced by various kinds of digital exposing means using various arrays of light-emitting devices and spatial modulating devices which extend in a direction perpendicular to the direction in which the light-sensitive material A is transported for scanning. A specific example includes digital raster exposing means using a PDP (plasma display) array, an ELD (electroluminescent display) array, an LED (light-emitting diode) array, an LCD (liquid-crystal display) array, a DMD (digital micromirror device) array, or a laser array.

The means of transporting the light-sensitive material A for scanning also is not limited to any particular type and it may be exemplified by various sheet transport means. Specific advantageous examples include scanning transport means using two transport roller pairs that are provided on opposite sides of the recording position X (scanning line), and scanning transport means using an exposing drum that transports the light-sensitive material A as it is held in the recording position X and two nip rollers which are provided on opposite sides of the recording position X in such a way that they are held in contact with the exposing drum.

In the recording apparatus 10, the scanning transport means is provided below the exposing unit 34 and the scanning transport is preferably effected in a horizontal or generally horizontal direction.

The transport means of transporting the light-sensitive material A from the cutter 28 to the scanning transport means and from the scanning transport means to the distributing device 18 to be described later and further from the distributing device 18 to the processor is not limited in any particular way and all of the known methods for transporting sheetings such as nip rollers, nip belts, belt conveyors and lift transport using suckers or the like may be employed.

In the illustrated recording apparatus 10, the image recording section 16 is positioned above the light-sensitive material supply section 12 and the transport means for transporting the light-sensitive material A from the cutter 28 to the scanning transport means is adapted to transport the light-sensitive material A such that its recording side faces up as it is passes through the recording position by the scanning transport means.

Hence, the light-sensitive material A emerging from the supply section 12 is transported upward and, after its transport path is bent such that its recording side faces up, the light-sensitive material A is fed into the scanning transport means and illuminated with the recording light L projected from above, i.e., from the exposing unit 34 provided above the scanning transport means. As a result, the exposed light-sensitive material A is fed into the processor, with its recording side facing up.

In order to ensure that the cutter 28 in the recording apparatus 10 can cut the light-sensitive material A to the correct length and also to achieve correct scanning transport by ensuring that the cutting of the light-sensitive material A and the recording of a back print will not introduce any load variations into the transport of the light-sensitive material A for scanning by the scanning transport means, the distance from the cutter 28 to the recording position X and the length of the light-sensitive material A from the printer 14 to the recording position X, each varying with the length of a print of the largest size as taken in the direction of transport, must be greater than that length. In other words, a cutting buffer and a pre-exposure buffer have to be secured in order to isolate the components mentioned above.

If a non-impact printer such as an ink-jet printer is used as the printer 14, there is no possibility that the recording of a back print will introduce load variations into the transport of the light-sensitive material Z for scanning; as a result, the length of the pre-exposure buffer can be made equal to that of the cutting buffer (i.e., the distance from the cutter 28 to the recording position X), whereby the transport pathlength of the light-sensitive material A can be shortened. In addition, a loop forming zone to form a loop (slack) of the light-sensitive material A may be provided midway its transport path and, as a result, the load variations that may be introduced by individual components into the transport of the light-sensitive material are eliminated to achieve further reduction in its linear pathlength.

Thus, by using the techniques and means described above, the recording apparatus 10 can be made more compact and less expensive.

Speaking of the formation of loops of the light-sensitive material A, prints of the smaller size may travel linearly and a loop is formed only in the case of handling prints of the larger size; alternatively, a loop may be formed even in the case of handling prints of the smallest size.

The distributing device 18 is provided downstream of the image recording section 16. The distributing device 18 distributes individual sheets of the light-sensitive material A in a lateral direction which is perpendicular to the direction of their transport (hence, their transport through the developing machine) to form a plurality of rows, which are supplied to the developing machine.

With common silver salt photographic materials which are currently used in printing photographs, development processing is more time-consuming than exposure, and if exposure is performed continuously, development processing cannot keep pace with the exposure but lags behind it and this introduces the need that the as-exposed light-sensitive material be stored temporarily in a reservoir, a stocker or the like.

The distributing device 18 is provided with a view to eliminating this difficulty and by distributing individual sheets of the light-sensitive material A sidewise to form a plurality of rows that overlap in the direction of transport, the throughput of the developing machine can be improved (almost doubled in two rows and tripled in three rows) and the time difference between development processing and exposure is practically cancelled.

Figure 2:
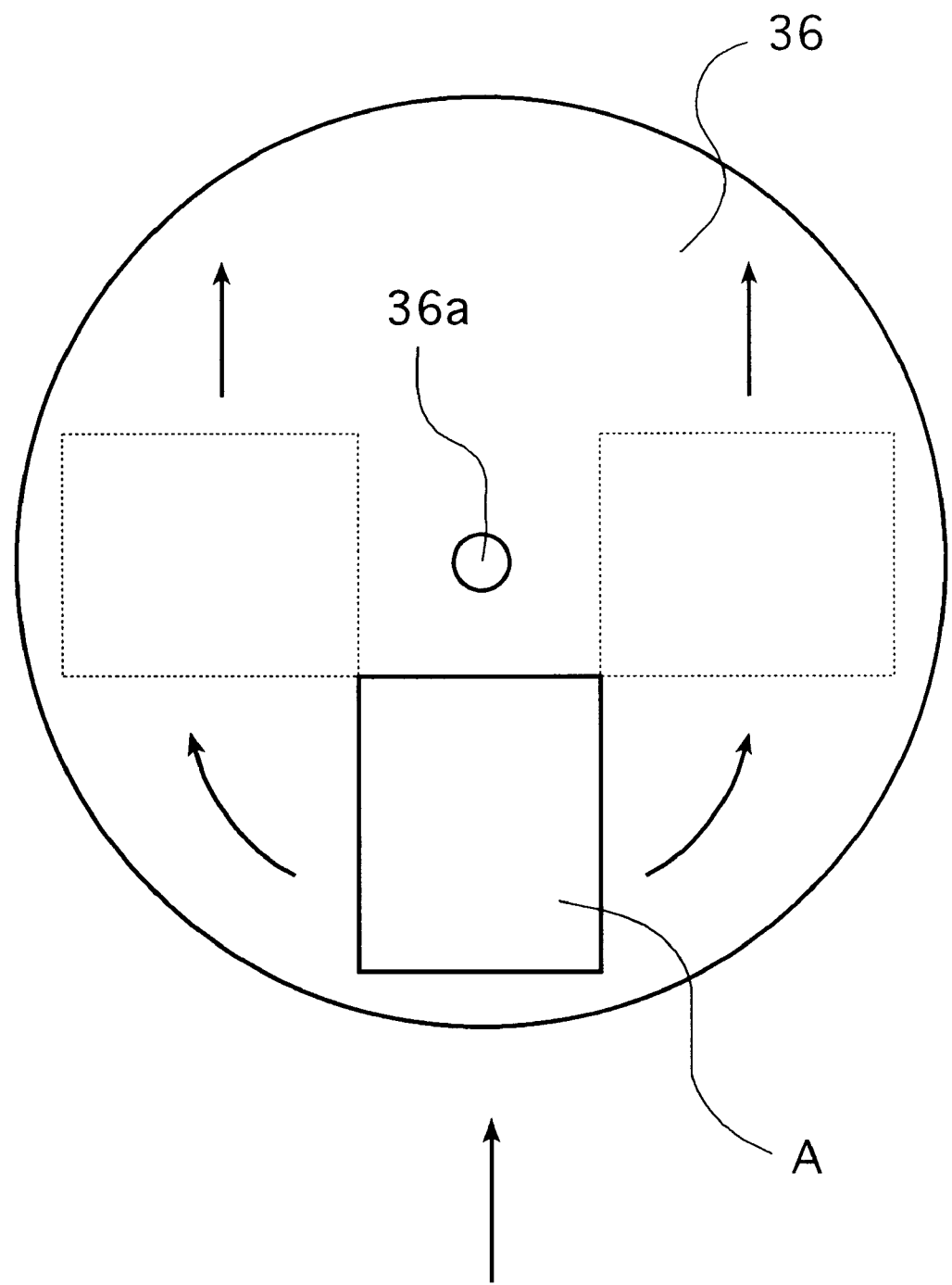
FIG. 2 is a conceptual diagram showing an exemplary light-sensitive material distributing means for use in the image recording apparatus of the invention.

In the invention, the distributing device 18 is not limited to any particular type and various sheet distributing devices are applicable, as exemplified by a distributing device using a turret 36 which rotates about a shaft 36*a* as shown in FIG. 2, and a distributing device of the light-sensitive material A in which the transport means of the light-sensitive material A is divided into a plurality of blocks, say, three blocks and the center block is moved sidewise.

Additionally, the distributing device of a type that can accommodate the light-sensitive material in parallel with the exposure (scanning transport) by the image recording section 16 and which is capable of distributing cut sheets of the light-sensitive material A efficiently and rapidly over a short distance. This device which is described below in detail may be called a "short-length distributing device" and is preferably used in the invention.

Figure 3A:
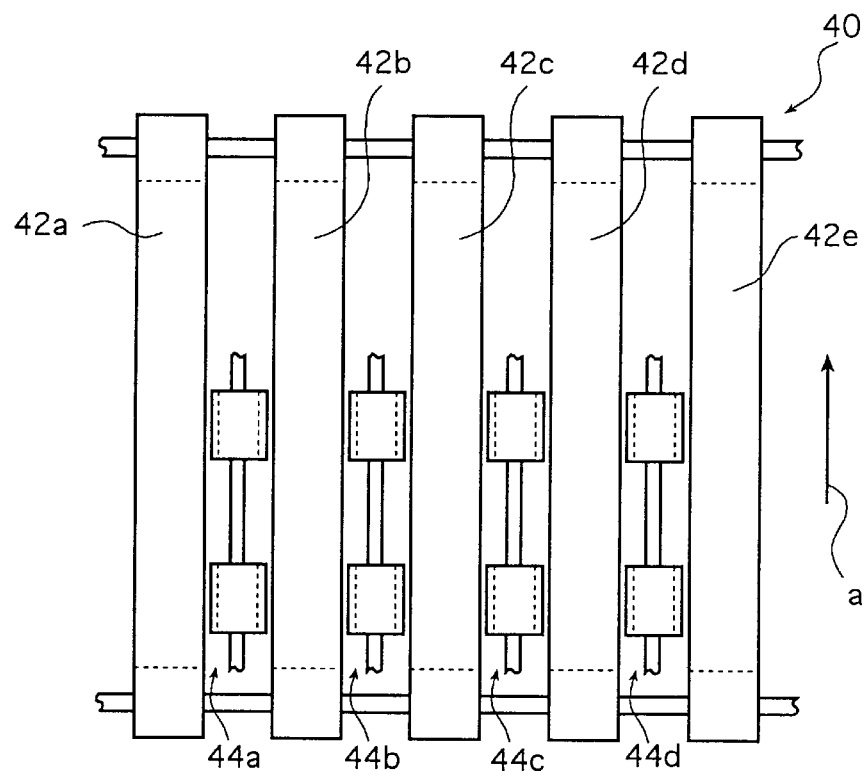
FIG. 3A is a top view showing diagrammatically another example of the light-sensitive material distributing means for use in the image recording apparatus of the invention.
Figure 3B:
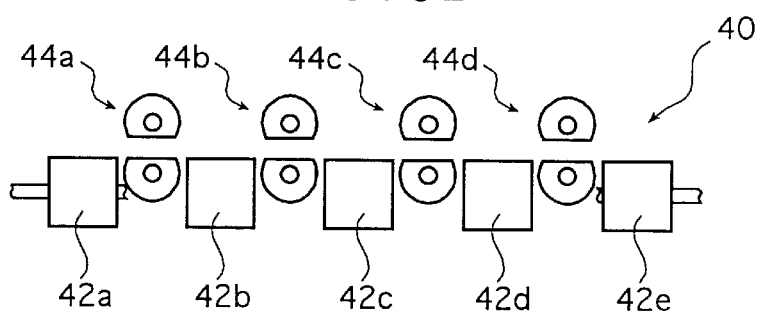
FIG. 3B is a side view of FIG. 3A.
Figure 3C:
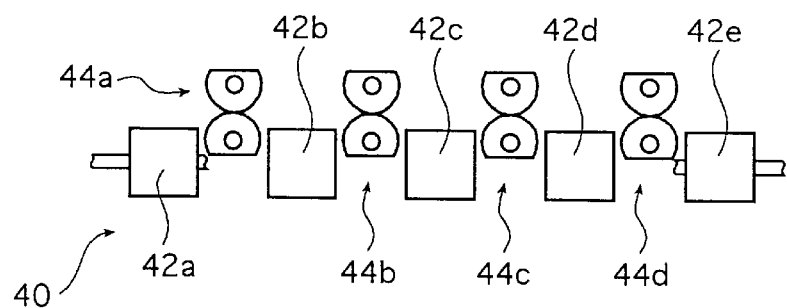
FIG. 3C is also a side view of FIG. 3A but in a different state than shown in FIG. 3B.

FIGS. 3A, 3B and 3C show an exemplary short-length distributing device 40. The short-length distributing device 40 is a device using belt conveyors and semicircular (D-shaped) rollers which are produced by cutting a cylinder along the longitudinal axis in such a way as to form a flat portion in a selected area of the transport surface. In the illustrated case, it is composed of five spaced belt conveyors 42 (42*a*, 42*b*, 42*c*, 42*d* and 42*e*) which transport the light-sensitive material A downstream (as indicated by arrow a in FIG. 3A) and semicircular roller pairs 44 (44*a*, 44*b*, 44*c* and 44*d*) which are provided between adjacent belt conveyors 42 to distribute individual sheets of the light-sensitive material A sidewise to form a plurality of rows.

As shown in FIG. 3B, when the light-sensitive material A travelling from an upstream position is drawn into the short-length distributing device 40, each semicircular roller pair 44 is in such a state that their flat portions are opposed to each other. In the case under consideration, the flat portion of the lower positioned semicircular roller is set at the same level or slightly lower than the transport surfaces of the belt conveyors 42, so the transport of the light-sensitive material A by means of the belt conveyors 42 and so forth will in no way be compromised.

When the individual sheets of light-sensitive material A have been transported to a specified position, the semicircular roller pairs 44 rotate in a specified direction to distribute those sheets, namely, clockwise if the sheets are to be distributed to the right of FIG. 3A and counterclockwise if they are to be distributed to the left. As is clear from FIG. 3C, if the semicircular roller pairs 44 rotate, the transport surfaces of the lower positioned semicircular rollers will rise above the transport surfaces of the belt conveyors 42, thereby lifting the sheets of light-sensitive material A from the belt conveyors 42; subsequently, the sheets are held between the upper and lower members of each semicircular roller pair 44 and transported sidewise to be distributed in a plurality of rows.

Another preferred example of the short-length distributing device 40 is the combination of belt conveyors as transport means which carries the individual sheets of light-sensitive material A and transports them downstream and lift transport means as a distributing means which lifts the sheets of light-sensitive material A using suckers or the like and transports them sidewise so that they are distributed in a plurality of rows. When the as-exposed sheets of light-sensitive material A have been transported to a specified position on the belt conveyors in the short-length distributing device 40, the lift transport means turns on to lift the sheets of light-sensitive material A and transports them either sidewise or obliquely (downstream) so that they are distributed in a plurality of rows.

With the aforementioned two types of distributing device, one using the turret 36 and the other which moving one of the split blocks of the transport means, in order to ensure that no load variations will be introduced into the scanning transport of the light-sensitive material A during exposure, a post-exposure buffer (which also serves as a pre-distribution buffer) has to be provided in zone A (see FIGS. 1A and 1B) downstream of the recording position X and it is also necessary that a means of transporting the distributed sheets of light-sensitive material A (which serves as a post-distribution buffer) be provided downstream of the distributing device.

As already mentioned, the light-sensitive material A is usually transported for scanning as it is held between rollers or the like, so even if part of the light-sensitive material A being exposed is placed on the driven belt conveyor, the load variation that will be introduced into the scan transport of the light-sensitive material is negligibly small. Therefore, the use of the short-length distributing device described above offers the advantage that it can be provided immediately after the recording position X without any intervening post-exposure buffer and that the cut sheets of the light-sensitive material A being exposed can be received by the short-length distributing device at the same speed as the speed at which they are transported for scanning and the as-exposed sheets of the light-sensitive material can be distributed immediately after they have been accommodated in the transport means, with the distributed sheets being immediately transported downstream.

Thus, by using the short-length distributing device, the pathlength of the light-sensitive material A can be considerably shortened. In addition, it is not absolutely necessary for the short-length distributing device that the travelling speed of the belt conveyor be equal to the speed at which the light-sensitive material A is transported for scanning.

The embodiments shown in FIGS. 1A and 1B are preferred ones having the distributing device 18; however, these are not the sole case of the invention and the image recording apparatus of the invention may not be equipped with the distributing device 18 so that the developing machine is supplied with a single row of sheets of the light-sensitive material A. This type of machine is not efficient in the throughput of a printer/processor but on the other hand it is less expensive. To implement this embodiment, the distributing device 18 is removed and a post-exposure buffer is secured such that the exposed light-sensitive material A is transported into the processor.

The recording apparatus shown in FIG. 1A is adapted to record a back print before exposure of the light-sensitive material. This is not the sole case of the invention and the apparatus may be modified to record a back print after exposure of the light-sensitive material A. FIG. 1B shows an exemplary case of this embodiment.

As shown, a post-exposure buffer (zone B) for the printer 14 is provided downstream of the recording position X and the printer is provided in a bent-down transport path; subsequently, the distributing device 18 is provided in a bent-up transport path such that cut sheets of the light-sensitive material A are distributed in a plurality of rows before they are transported into the processor. Even in this alternative case where back printing is done after exposure, the use of a non-impact printer and a short-length distributing device contributes to shortening the pathlength of the light-sensitive material A by providing a linear transport path downstream of the recording position X.

If the distributing device 18 is not used in the embodiment shown in FIG. 1B, a modification may be made as in the case of omitting the distributing device 18 from FIG. 1A; the transport path of the light-sensitive material A downstream of the recording position X is made straight and the printer 14 is provided in the same position as the distributing device 18 shown in FIG. 1A.

Thus, the recording apparatus 10 of the invention retains the basic layout, i.e., the image recording section 16 is provided above the light-sensitive material supply section 12 and the transport path of the light-sensitive material A is formed in such a way that its recording side (emulsion-coated side) faces up in the recording position X, and yet machine grade-up, cost reduction and various versions suited to various alterations in specifications can be easily accomplished.

Figure 4A:
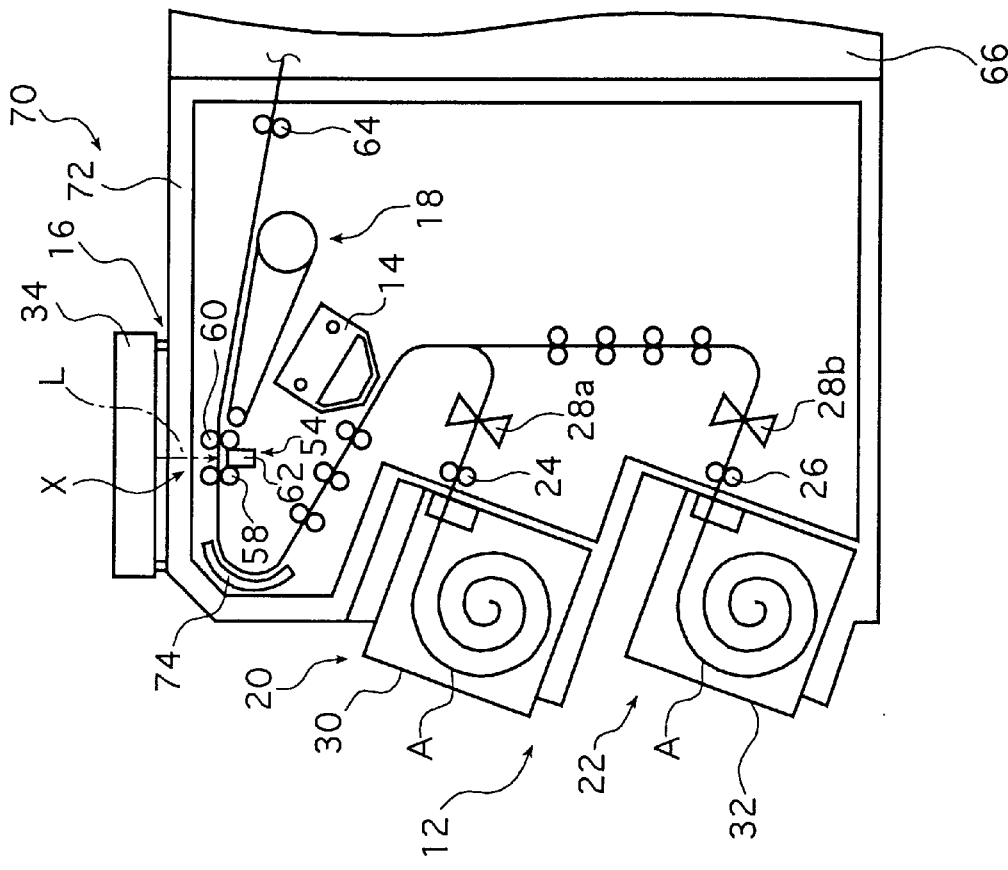
FIGS. 4A and 4B show diagrammatically two other examples of the image recording apparatus of the invention.
Figure 4B:
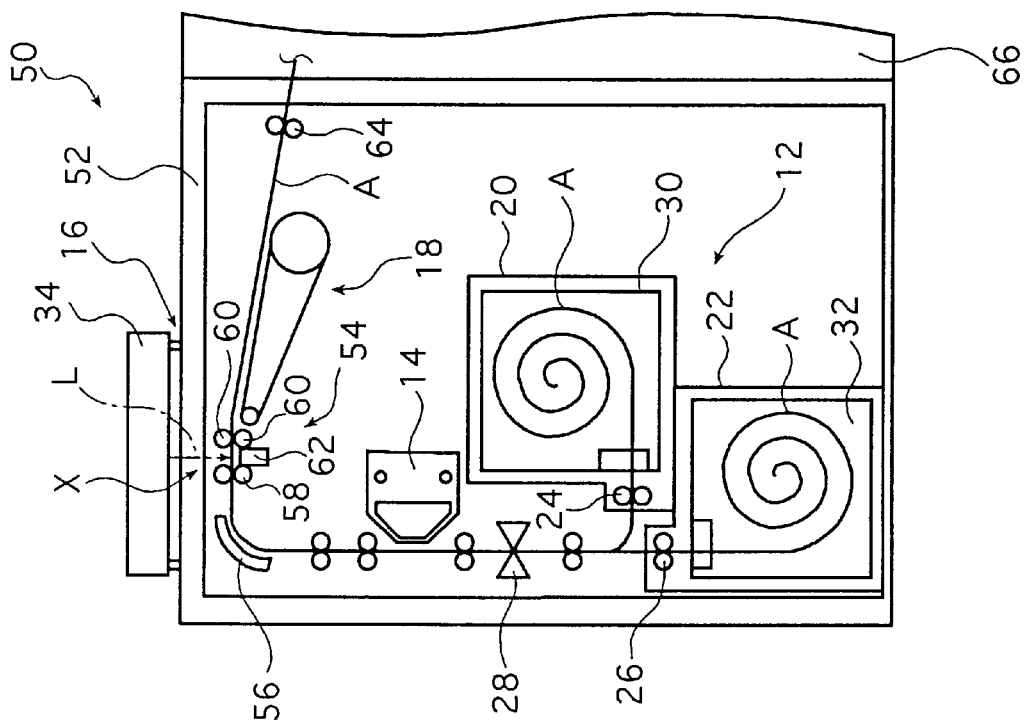

FIGS. 4A and 4B show diagrammatically two examples of the image recording apparatus of the invention. The image recording apparatus shown in FIGS. 4A and 4B are specific examples of the recording apparatus 10 shown in FIG. 1A and, hence, like components are identified by like numerals and the following description is mainly directed to those components which are specific examples of the apparatus of FIGS. 4A and 4B. It should also be noted that, in addition to the illustrated components, means of transporting the light-sensitive material A such as transport rollers, transport guides, sensors and various other members are also incorporated, as required, in the recording apparatus 50.

The image recording apparatus indicated by 50 in FIG. 4A (which is hereinafter referred to simply as "recording apparatus 50") is of a magazine built-in type in which loaders 20 and 22 of magazines 30 and 32, respectively, are set within the recording apparatus 50.

The light-sensitive material supply section 12 containing loaders 20 and 22 are positioned in the lower left portion of the housing 52 of the recording apparatus 50, as seen in FIG. 4A, and the image recording section 16 having the exposing unit 34 and the scanning transport means 54 is positioned above the light-sensitive material supply section 12.

In the illustrated recording apparatus 50, the loaders 20 and 22 may be loaded with magazines 30 and 32 by first opening the cover on the front side toward the operator (and away from the plane of the paper) and placing the respective magazines into the loaders in a direction perpendicular to the plane of the paper.

The light-sensitive material A withdrawn from the magazines 30 and 32 in the loaders 20 and 22 is transported substantially vertically upward by the transport means, has its transport path bent about 90 degrees to the right by means of a transport guide 56, whereupon it travels almost horizontally to be fed into the scanning transport means 54, with its recording side facing up.

The cutter 28 and printer 14 using an ink ribbon are provided midway the transport path of the light-sensitive material A. As already mentioned, the transport of the light-sensitive material A stops at the point of time when it has been transported downstream from the cutter 28 by a length corresponding to each of the prints to be produced; thereafter, the cutter 28 turns on to cut the light-sensitive material A to individual sheets of a specified length, which are subjected to back printing with the printer 14 in parallel with their transport.

As described above, the image recording section 16 comprises the exposing unit 34 and the scanning transport means 54. In the illustrated case, the exposing unit 34 may be the aforementioned optical beam scanner which exposes the light-sensitive material A using as the recording light L an optical beam that has been modulated in accordance with the recorded image and which is deflected in the main scanning direction (normal to the plane of FIGS. 4A and 4B) which is perpendicular to the direction in which the light-sensitive material A is transported for scanning by the scanning transport means 54. The exposing unit 34 is located above the scanning transport means 54.

On the other hand, the scanning transport means 54 comprises two transport roller pairs 58 and 60 located on opposite sides of the recording position X (scanning line) and a transport guide for exposure 62 to hold more precisely the light-sensitive material A in the recording position X.

With it being guided by means of the transport guide 62, the light-sensitive material A is transported by means of the transport roller pairs 58 and 60 in an auxiliary direction which is perpendicular to the main scanning direction. As already mentioned, the optical beam is deflected in the main scanning direction, so the light-sensitive material A is exposed by two-dimensional scanning with the optical beam to form a latent image on the material Z.

The distributing device 18 is provided downstream of the image recording section 16. The as-exposed sheets of light-sensitive material A are distributed sidewise (in a direction perpendicular to their transport) in the distributing device 18 to align in a plurality of rows that overlap in the direction of transport. Subsequently, the sheets of light-sensitive material A are fed into a processor 66 by means of a transport roller pair 64 and subjected to the necessary treatments in color development, bleach-fix, rinse and other tanks in a manner suitable to the light-sensitive material A and thereafter dried to yield final prints.

In the recording apparatus shown in FIG. 4A, the distributing device 18 is of the aforementioned short-length type and it can be provided immediately after the recording position X to shorten the pathlength of the light-sensitive material A.

The recording apparatus indicated by 70 in FIG. 4B has the loaders 20 and 22 formed as racks on the left sidewall of the housing 72 such that magazines 30 and 32 can be loaded from outside without opening a door or any other part of the housing.

In the embodiment under consideration, the pathlength from loader 20 to the recording position X differs so greatly from the pathlength from the loader 22 to the recording position X that cutters 28a and 28b are separately provided for the respective loaders.

Except for this point and the resulting change in the transport path of the light-sensitive material A, the recording apparatus 70 has basically the same layout as the recording apparatus 50 shown in FIG. 4A.

As in the recording apparatus 50, the image recording section 16 of the recording apparatus 70 is positioned above the light-sensitive material supply section 12 and the light-sensitive material A withdrawn from the magazines 30 and 32 is transported upward and cut with the associated cutters 28a and 28b to individual sheets, which are then subjected to back printing with the printer 14.

Subsequently, the light-sensitive material A has its transport path bent to the right by means of a guide 74 and thereafter travels on a substantially horizontal plane to be supplied into the scanning transport means 54 with its recording side facing up, so that it is subjected to imagewise exposure in the image recording section 16.

The cut sheets of the as-exposed light-sensitive material A are distributed into a plurality of rows by means of the distributing device 18 and thereafter transported by the transport roller pair 64 to be fed into the processor 66, where they are developed and given the necessary processing steps to produce prints.

Figure 5:
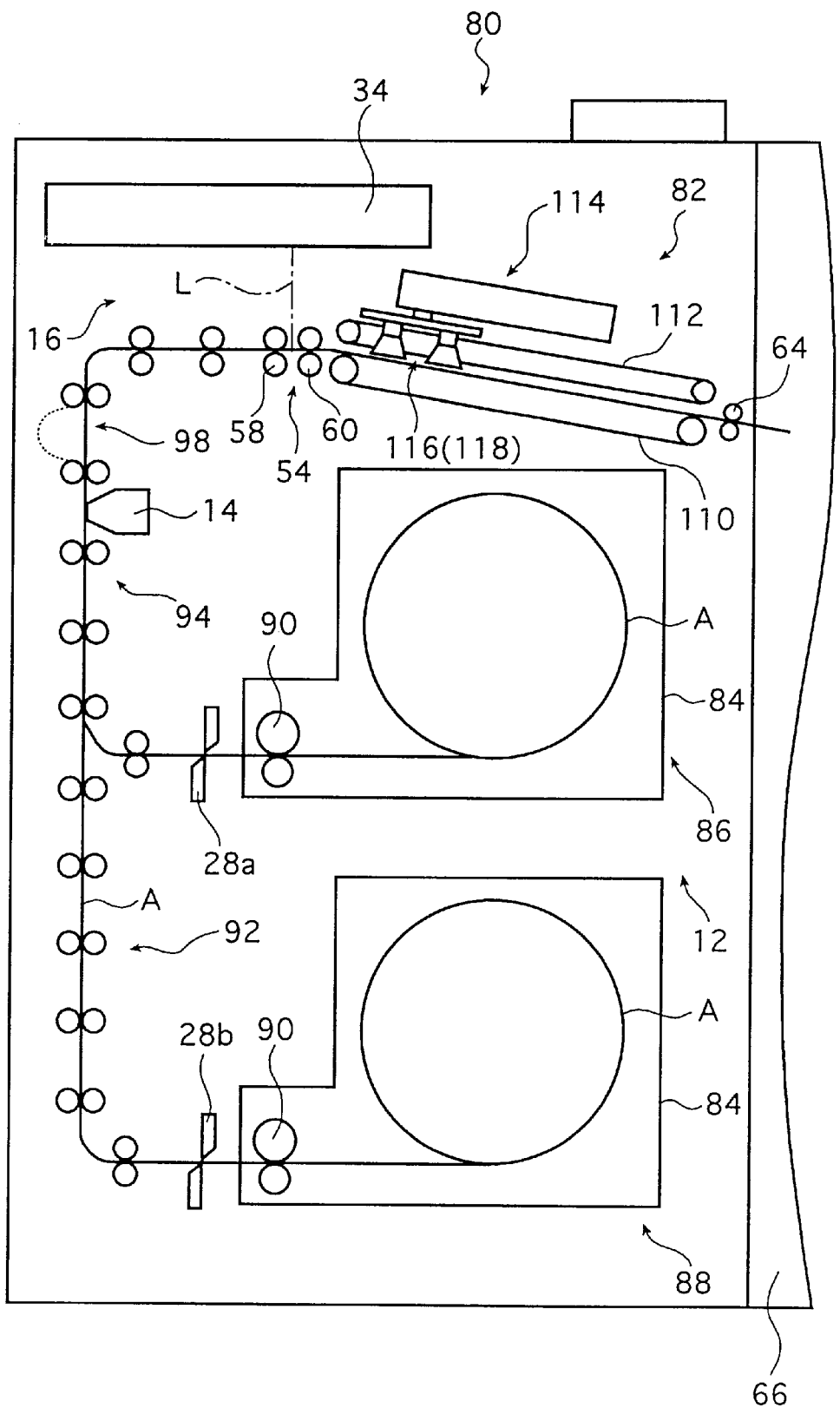
FIG. 5 shows diagrammatically yet another example of the image recording apparatus of the invention.

FIG. 5 shows diagrammatically yet another example of the image recording apparatus of the invention. Again, like sites are identified by like numerals and the following explanation is chiefly directed to the differing sites, and besides the components actually shown in FIG. 5, means of transporting the light-sensitive material A such as transport rollers, transport guides, sensors and so forth may be provided as required.

The image recording apparatus indicated by 80 in FIG. 5 and which is hereunder simply referred to as "recording apparatus 80" has basically the same layout as the aforementioned recording apparatus 10, 50 and 70 and comprises the light-sensitive material supply section 12, cutters 28a and 28b, printer 14, the image recording section 16 positioned above the light-sensitive material supply section 12 and the short-length distributing device 82.

The light-sensitive material supply section 12 of the recording apparatus 80 has two loaders 86 and 88, each loaded with a magazine 84 containing the light-sensitive material A rolled on itself, with the recording side facing up.

In the illustrated recording apparatus 80, each magazine 84 has a built-in withdrawing roller pair 90, the upper roller of which may be a drive roller. When the magazines 84 are placed in a specified position in the loaders 86 and 88, they are brought into engagement with drive sources for the associated withdrawing roller pairs that are provided in the respective loaders.

The means of bringing the withdrawing roller pairs 90 into engagement with the associated drive sources in the respective loaders 86 and 88 is not limited in any particular way and various known methods of engagement are applicable. In one method, an end of the rotating shaft of the drive roller of each withdrawing roller pair 90 is extended to the outside of each magazine 84 and connected to a pulley; an elastic endless belt stretched around three pulleys one of which is in engagement with the drive source is used as a drive means and the magazine 84 is placed in a specified position in each of the loaders 86 and 88, whereupon said pulley is urged against the endless belt which, in turn, is wrapped around the pulley. With the recording apparatus 80 designed in this way, the rotating endless belt will cause the withdrawing roller pair 90 to rotate.

Alternatively, a gear rather than a pulley may be provided and the magazine 84 is loaded, whereupon the withdrawing roller pair 90 meshes with the drive source gear. Many other methods may be employed to achieve engagement between the withdrawing roller and the drive source in the associated loader.

The light-sensitive material A withdrawn from the magazine 84 in the loader 88 is cut to sheets of a specified length by means of the cutter 28b and the sheets are transported upward by means of a first transport section 92 and a second transport section 94, each composed of a plurality of transport roller pairs. The light-sensitive material A withdrawn from the magazine 84 in the loader 86 is cut to sheets of a specified length by means of the cutter 28a and the sheets are transported upward by means of the second transport section 94. Thereafter, the light-sensitive material A travels to the right as seen in FIG. 5 to be transported, with the recording side facing up, into the image recording section 16 (the scanning transport means 54 to be more exact).

As shown, the printer 14 is provided midway of the second transport section 94 so that it records a back print on the light-sensitive material as it is transported by means of the second transport section.

The two transport rollers in the second transport section 94 which are immediately downstream of the printer 14 are spaced apart by a sufficient distance to provide a loop forming area 98. In other words, the second transport section 94 is adjusted to be such that the light-sensitive material A is transported downstream of the loop forming area 98 at the same speed as it is transported for scanning in the image recording section 16 whereas it is transported upstream of the loop forming area 98 at a slightly faster speed. Thus, the light-sensitive material A being transported through the second transport section 94 forms a loop as indicated by the dotted line in the loop forming area 98, and which is dependent on the size of the area 98. As a result, the printer 14 is isolated from the image recording section 16 by a short enough pathlength to realize precise transport of the light-sensitive material A in an auxiliary scanning direction.

The image recording section 16 is composed of the exposing unit 34 and the scanning transport means 54. As in the recording apparatus 10, 50 and 70, the scanning transport means 54 is composed of two transport roller pairs 58 and 60 provided on opposite sides of the recording position (scanning line) X, and an exposure transport guide (not shown in FIG. 5) for helping the light-sensitive material A to be held appropriately in the recording position X.

Figure 6:
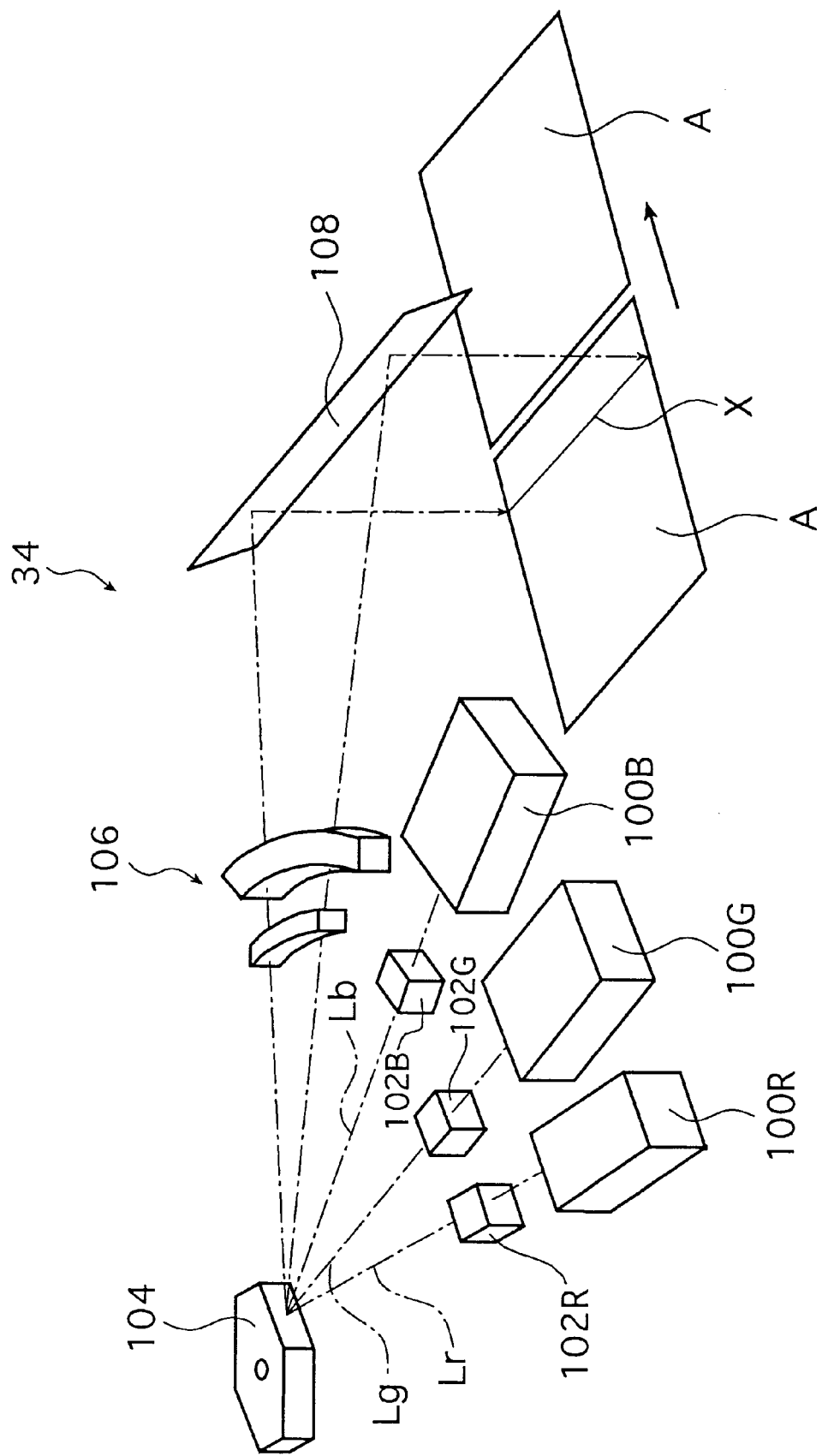
FIG. 6 is a diagrammatic perspective view of the exposing unit in the image recording apparatus shown in FIG. 5.

FIG. 6 is a diagrammatic perspective view of the exposing unit 34. The exposing unit 34 is tri-laser light different-angle incidence optics (i.e., three light-source uncombined optics) which performs scan exposure on the light-sensitive material A using light beams of three primary colors; it comprises laser light sources 100 (100R, 100G and 100B), as well as AOMs 102 (102R, 102G and 102B), a polygonal mirror 104, an fθ lens 106 and a mirror 108 which are arranged in the direction of travel of light beams L (Lr, Lg and Lb) issued from the respective light sources. Besides these components, the exposing unit 34 may have other optical elements and devices arranged as required and they include optical beam shaping lenses, condenser lenses, tilt correcting optics, optical path changing mirrors and sensors.

The illustrated three light-source uncombined optics uses three laser light sources that emit optical beams of specified wavelengths corresponding to the exposure of the light-sensitive material A to red (R), green (G) and blue (B) light; the optical beams L issuing from the respective laser light sources are allowed to be incident at a single point on a reflecting surface of the polygonal mirror 104 at slightly different angles (for example, about, four degrees) and deflected in a main scanning direction to be focused at different angles on the same main scanning line on the light-sensitive material A; such scanning is performed at time intervals on the same main scanning line.

In a typical case, the laser light source 100R is a semiconductor laser (LD) issuing an optical beam Lr for R exposure at a wavelength of 662 nm; the laser light source 100G is a wavelength converted laser using a SHG device that issues an optical beam Lg for G exposure at a wavelength of 532 nm; the laser light source 100B is also a wavelength converted laser using a SHG device but which issues an optical beam Lb for B exposure at a wavelength of 473 nm.

AOMs 102 are devices by which the optical beams L issuing from the laser light sources 100 are modulated in accordance with the image to be recorded. The modulated optical beams L are then incident at the same point on a reflecting surface of the polygonal mirror 104, deflected by the surface and processed by the fθ lens 106 so that they will eventually be focused correctly in the recording position X on the main scanning line; thereafter, the optical beams L are reflected by the mirror 108 to be incident in the exposing position X (scanning line) on the light-sensitive material A as it is transported in an auxiliary direction by the scanning transport means 54.

The short-length distributing device 82 is provided downstream of the image recording section 16. It is a distributing device which employs belt conveyors of the aforementioned type and lift transport means using suckers. Specifically, the short-length distributing device 82 is composed of belt conveyors 110 as transport means on which the light-sensitive material A is placed and transported downstream, auxiliary belt conveyors 112 of a smaller width that are disposed above the respective belt conveyors 110 along the center of their width, and distributing means 114.

The belt conveyors 110 and the auxiliary belt conveyors 112 are not of such a type that the light-sensitive material A being transported is held between one belt conveyor 110 and the opposed auxiliary belt conveyor 112; in fact, the auxiliary belt conveyors 112 are slightly spaced from the belt conveyors 110 to which they are opposed. Briefly, the chief function of the auxiliary belt conveyors 112 is to depress any curl of the light-sensitive material A so as to assist in its transport with the belt conveyors 110 and also to ensure that it is positively sucked in position by the distributing means 114 (in particular, suction units 116 and 118).

The speed at which the light-sensitive material A is transported by the belt conveyors 110 and the auxiliary belt conveyors 112 is set to be slightly faster than the speed at which it is transported for scanning. This assures positive elimination of the effect the drive of the belt conveyors 110 and the auxiliary belt conveyors 112 will have on the scanning transport of the light-sensitive material A.

The distributing means 114 has two suction units 116 and 118 each having two suckers connected to a suction means (not shown). The suction units 116 and 118 are provided on opposite sides of the width of each auxiliary belt conveyor 112. The suction unit 116 provided toward the operator (and away from the plane of the paper) sucks the light-sensitive material A in position and lifts it to some height, moves it obliquely downstream to the right (toward the operator and away from the plane of the paper) as seen in the direction of transport of the light-sensitive material A and, thereafter, the suction is released to set aside a cut sheet of the light-sensitive material to the right. Similarly, the suction unit 118 provided away from the operator lifts the light-sensitive material A and moves it obliquely downstream to the left so that a cut sheet of the light-sensitive material is set aside to the left.

To attain these results, each auxiliary belt conveyor 112 should have such a width that even a sheet of the light-sensitive material A that has the smallest lateral size across can be sucked in position by means of the suction units 116 and 118.

The means of moving the suction units 116 and 118 is not limited in any particular way and various known methods may be applicable, as exemplified by a moving means using links, a means using cams, means using guide rails and guide slots, and appropriate combinations of these methods.

Cut sheets of the as-exposed light-sensitive material A are ejected onto the belt conveyors 110 but, being held by the scanning transport means 54 (specifically by the transport roller pair 60), the transport of the light-sensitive material A is governed by the scanning transport means 54 and its transport speed is equal to the speed at which it is transported for scanning. When the light-sensitive material A is released from the scanning transport means 54 and transported to a specified position by the belt conveyors 110, the sheets of the light-sensitive material are sucked and lifted, as required, by the suction unit 116 or 118 and subsequently set aside to either right or left.

For example, if setting aside of a sheet to the right by means of the suction unit 116, setting aside to the left by means of the suction unit 118 and straight passage of a sheet without setting it aside in either direction are repeated in succession, cut sheets of the light-sensitive material A can be distributed in three rows; on the other hand, if setting aside to the right by means of the suction unit 116 alternates with setting aside to the left by means of the suction unit 118, sheets of the light-sensitive material A can be distributed in two rows.

The illustrated recording apparatus 80 and other versions of the image recording apparatus of the invention may be adapted not to distribute cut sheets of all types of light-sensitive material A; if sheets of the light-sensitive material are too large to be processed in a plurality of rows or if batchwise rather than continuous processing is to be performed, sheets of the light-sensitive material A may not be distributed in a plurality of rows but supplied in a single row into the processor 66.

If sheets of the light-sensitive material A are to be distributed at all, they may be distributed in the same number of rows regardless of their size or, alternatively, they may be distributed in different numbers of rows depending upon the size of the light-sensitive material A, for example, in three rows for L size or in two rows for an 8×10 inch size.

The light-sensitive material emerging from the short-length distributing device 82 is fed by the transport roller pair 64 to be driven into the processor 66.

While the image recording apparatus of the invention has been described above in detail, the foregoing is by no means the sole example of the invention and various improvements and alterations can of course be made without departing from the spirit and scope of the invention.

As described above in detail, according to its first aspect, the present invention can realize an image recording apparatus for use in a digital photoprinter and the like that perform digital exposure, the recording of back prints and so forth on cut sheets of a light-sensitive material and, in particular, the apparatus features good maintainability, ease in achieving machine grade-up, and alterations in specifications, cost reduction as well as compactness and high operating efficiency.

On the pages that follow, we will describe more specifically the light-sensitive material distributing device according to the second aspect of the invention with reference to accompanying drawings 7–14.

Figure 7:
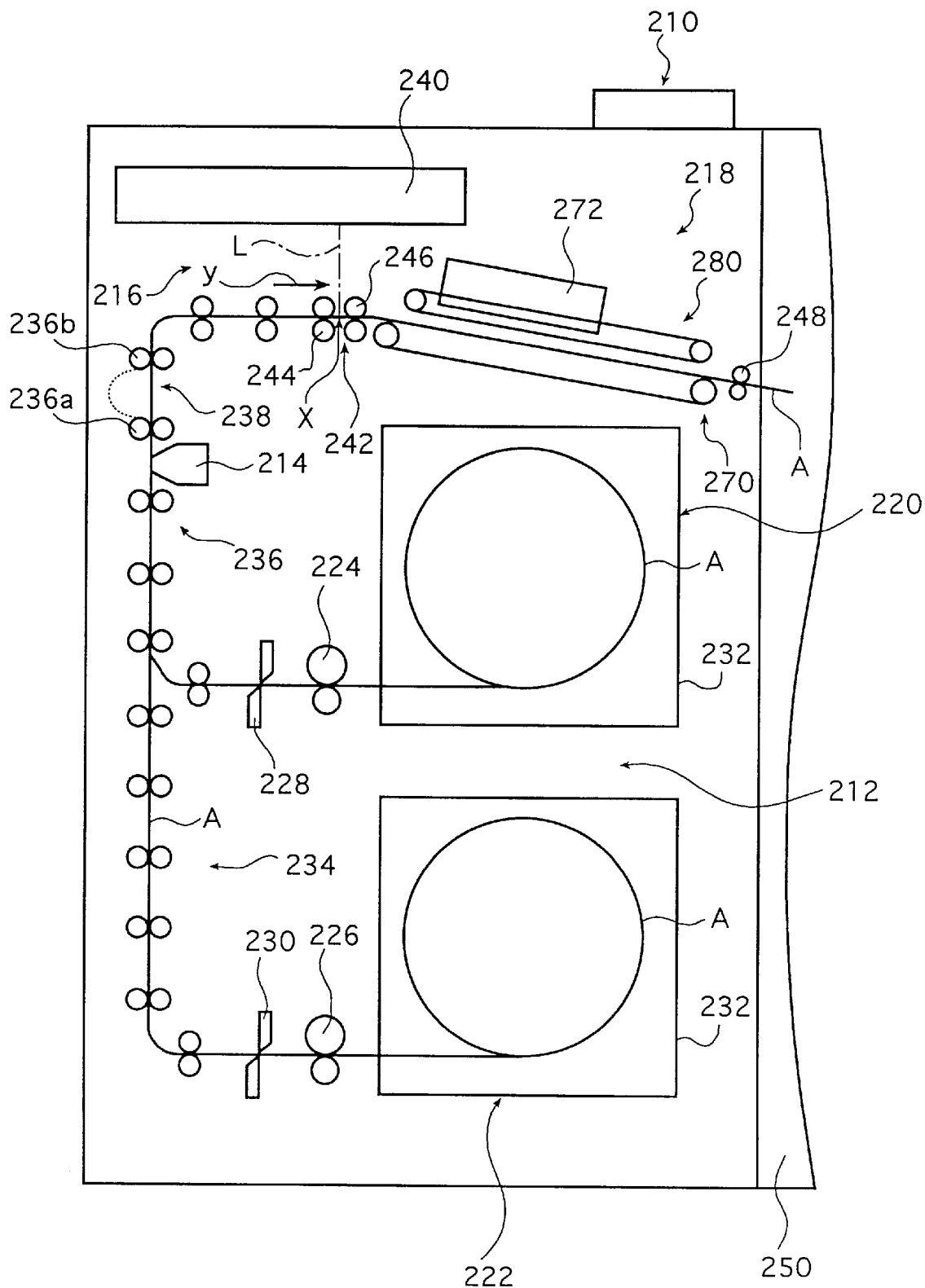
FIG. 7 is a conceptual diagram showing an image recording apparatus employing the light-sensitive material distributing device according to the second aspect of the invention.

FIG. 7 is a conceptual diagram showing an image recording apparatus employing the light-sensitive material distributing device of the invention. The image recording apparatus indicated by 210 in FIG. 7 and which is hereinafter simply referred to as the "recording apparatus 210" is used as the exposing device in the aforementioned digital photoprinter and a web of light-sensitive material is cut to individual sheets of a specified length associated with the prints to be finally produced and, after back printing (recording of a back print) and digital scan exposure, the exposed light-sensitive material A is distributed as required into a plurality of rows by means of the light-sensitive material distributing device of the invention and supplied to a processor (developing machine) 250.

Having these capabilities, the recording apparatus 210 comprises a light-sensitive material supply section 212, a printer 214 for back print recording, an image recording section 216 which exposes the light-sensitive material A in a recording (exposing) position X and a light-sensitive material distributing device 218 of the invention (hereinafter referred to as a "distributing device 218") which distributes the exposed light-sensitive material A into a plurality of rows.

It should be noted that, in addition to the illustrated components, means of transporting the light-sensitive material A such as transport rollers, transport guides, sensors and various other members are also incorporated, as required, in the recording apparatus 50.

Further referring to the recording apparatus 210, the light-sensitive material supply section 212 (hereinafter referred to as a "supply section 212") is composed of loaders 220 and 222, withdrawing roller pairs 224 and 226, and cutters 228 and 230.

The loaders 220 and 222 are sites into which are loaded magazines 232 containing a roll of light-sensitive material A within a lightproof case, with the recording surface side facing outward. The magazines 232 to be loaded into both the loaders 220 and 222 are usually adapted to contain different types of light-sensitive material A which is characterized by their size (width), surface gloss (silk-finish, matte and so forth), specifications (e.g. thickness and base type), and so forth. The number of the magazines 232 that can be loaded is by no means limited to two and it may be adapted to be capable of loading only one magazine or three and more magazines depending on the size and structure of the recording apparatus 210.

The withdrawing roller pair 224 or 226 is operated to withdraw the light-sensitive material A from the magazine 232 loaded into the corresponding loader 220 or 222 and the withdrawn light-sensitive material is transported. The transport stops at the point of time when the light-sensitive material A has been transported downstream from the corresponding cutter 228 or 230 by a length corresponding to each of the prints to be produced. Subsequently, the cutter 228 or 230 turns on to cut the light-sensitive material A to individual sheets of a specified length. It should be noted that one cutter can be used in a plurality of loaders.

The light-sensitive material A taken out of the magazine 232 in the loader 222 and cut into individual sheets of a specified length by means of the cutter 230 is transported upward by means of the first transport section 234 and the second transport section 236 consisting of a number of transport roller pairs. On the other hand, the light-sensitive material A taken out of the magazine 232 in the loader 220 and cut into individual sheets by means of the cutter 228 is transported upward by means of the second transport section 236. Subsequently, these sheets are both transported in the right direction to the image recording section 216 (scanning transport means 242) with the recording surface side facing upward.

The printer 214 is located in the middle of the second transport section 236.

The printer 214 is used to record on a non-record reverse surface of the light-sensitive material A (where no emulsion is coated), a back print consisting of various pieces of information, such as the date when the picture was taken, the date of printing (exposure), frame number, film identification (ID) number (code), ID number of the camera used to take the picture and ID number of the photoprinter. The light-sensitive material A is subjected to back print recording by means of the printer 214 as it is transported by means of the second transport section 236.

Examples of the printer 214 for back print recording include back printers for use in known photoprinters such as an ink-jet printer, a dot impact printer and a thermal transfer printer. To be compatible with the recently developed Advanced Photo System, the printer 214 is preferably adapted to be capable of marking at least two lines at a time.

A loop forming area 238 is provided between the transport roller pairs 236a and 236b which are downstream of the printer 214 in the second transport section 236.

Thus, the transport speed of the light-sensitive material A in the second transport section 236 is set as follows: the speed in the transport roller pair 236b and subsequent components which are downstream of the loop forming area 238 is the same as the scanning transport speed in the image recording section 216 (scanning transport means 242), whereas the speed in the transport roller pair 236a and prior components which are upstream of the loop forming area 238 is higher than the above scanning transport speed. The light-sensitive material A transported through the second transport section 236 forms a loop in the loop forming area 238 in accordance with its size based on the difference in the upstream/downstream transport speed, as shown by dotted line in FIG. 7.

In the illustrated recording apparatus 210, this configuration enables the separation of the printer 214 from the image recording section 216 with a short pathlength, whereby a highly precise scanning and transport of the light-sensitive material A in the course of exposure is realized.

The image recording section 216 comprises an exposing unit 240 and scanning transport means 242. The recording light L modulated in accordance with the image data (recorded image) and deflected in the main scanning direction (normal to the plane of FIGS. 7 and 8; direction indicated by arrow x in FIG. 9) which is perpendicular to the direction in which the light-sensitive material A is transported for scanning emits from the exposing unit 240 and is incident on the recording position X, as the light-sensitive material A is held in a specified recording position X by means of the scanning transport means 242 and transported for scanning in the direction indicated by arrow y, whereupon the light-sensitive material A is exposed by two-dimensional scanning to form a latent image on the material Z.

It should be noted that, in the illustrated image recording section 216, a side registering (edge position regulation) of the light-sensitive material A is performed so that the center of the light-sensitive material A in its main scanning direction can be set to a specified position, and the light-sensitive material A is then exposed based on the center.

The exposing unit 240 is a known optical beam scanner using the light beams including laser beam as the recording light L. The exposing unit 240 is composed essentially of light sources which issue optical beams for exposing the light-sensitive material A with red (R), green (G) and blue (B) lights, a modulating means such as AOM (acoustic optical modulator) which modulates the light beams issued from the light sources in accordance with digital image data, a light deflector such as a polygonal mirror which deflects the modulated light beams in a main scanning direction, an fθ (scanning) lens with which the light beams deflected in the main scanning direction are focused to form an image at a specified point in the recording position X in cooperation with specified beam optics, and a mirror for optical path adjustment.

The exposing unit 34 may be replaced by various kinds of digital exposing means using various arrays of light-emitting devices and spatial modulating devices which extend in a direction perpendicular to the direction in which the light-sensitive material A is transported for scanning. Specific examples of such arrays include a PDP (plasma display) array, an ELD (electroluminescent display) array, an LED (light-emitting diode) array, an LCD (liquid-crystal display) array, a DMD (digital micromirror device) array, or a laser array.

On the other hand, the scanning transport means 242 comprises two transport roller pairs 244 and 246 that are provided on opposite sides of the recording position X (scanning line), and an exposure guide 252 (see FIG. 8) to hold more precisely the light-sensitive material A in the recording position X. The light-sensitive material A is transported for scanning in the auxiliary scanning direction perpendicular to the main scanning direction, as it is held in the recording position X. The light beams as the recording light L are deflected in the main scanning direction, so the light-sensitive material A is exposed by two-dimensional scanning with the recording light L modulated in accordance with the image data to thereby form a latent image on the material Z.

Another example includes scanning transport means using an exposing drum that transports the light-sensitive material A as it is held in the recording position X and two nip rollers which are provided on opposite sides of the recording position X in such a way that they are held in contact with the exposing drum.

A distributing device 218 is located downstream of the image recording section 216.

The distributing device 218 is an example of the light-sensitive material distributing device of the invention. The distributing device 218 receives the light-sensitive material A ejected from the scanning transport means 242 in the image recording section 216 and transports in the same direction as the scan transport direction (indicated by arrow y), and at the same time, distributes as required individual sheets of the light-sensitive material A in a lateral direction which is perpendicular to the direction of their transport (that is, corresponding to the main scanning direction indicated by arrow x) to form a plurality of rows and transports to the transport roller pair 248, through which the light-sensitive material A is supplied (processor-entered) to the processor 250.

As described above, development processing is generally more time-consuming than exposure. The distributing device 218 distributes individual sheets of the light-sensitive material A to be processed in the processor 250 sidewise to form a plurality of rows that overlap in the direction of transport, the throughput of the processor 250 can be almost doubled in two rows and tripled in three rows and the time difference between development processing and exposure is practically cancelled.

Figure 8:
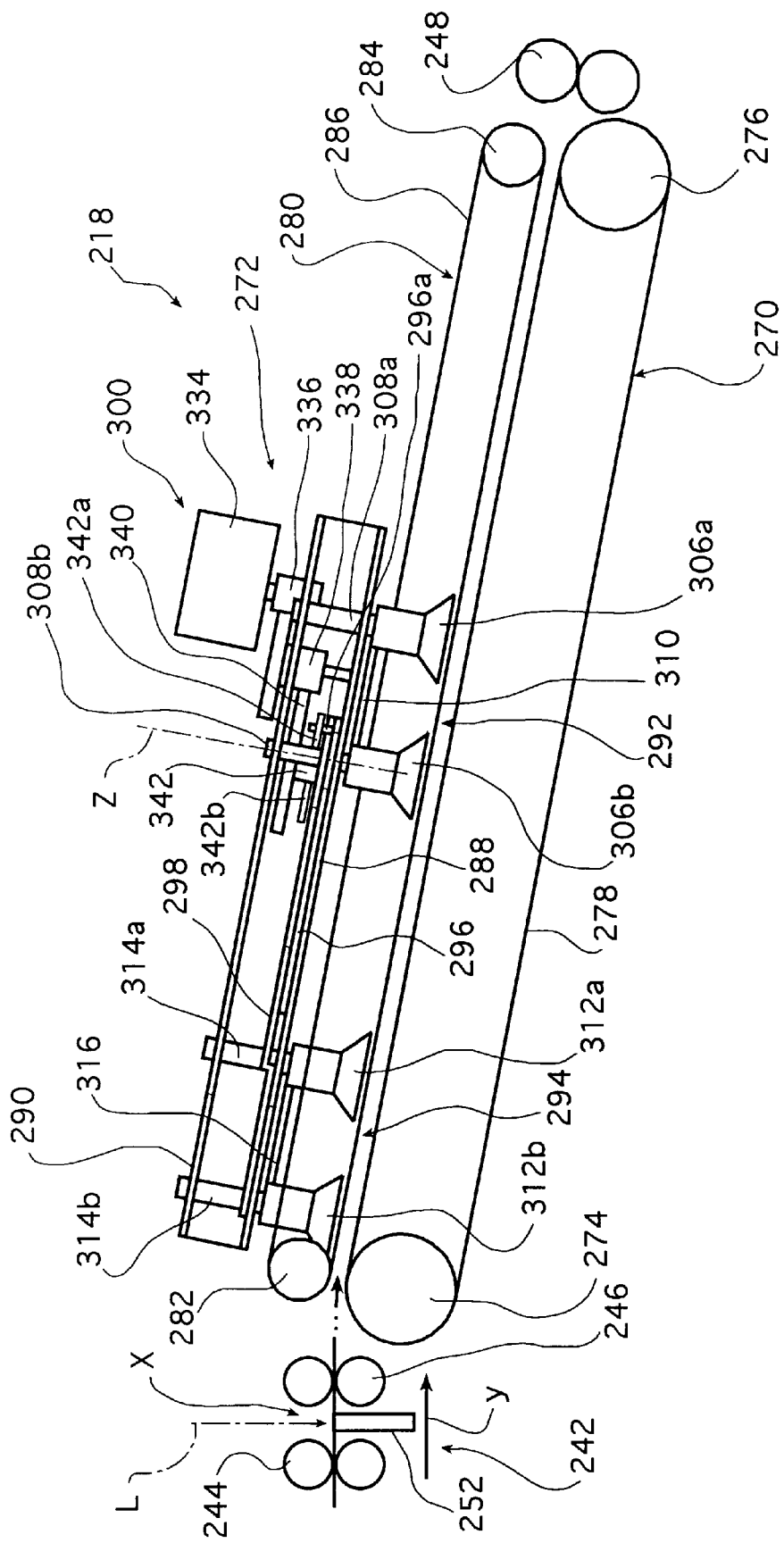
FIG. 8 is a diagrammatic side view of an example of the light-sensitive material distributing device.
Figure 9:
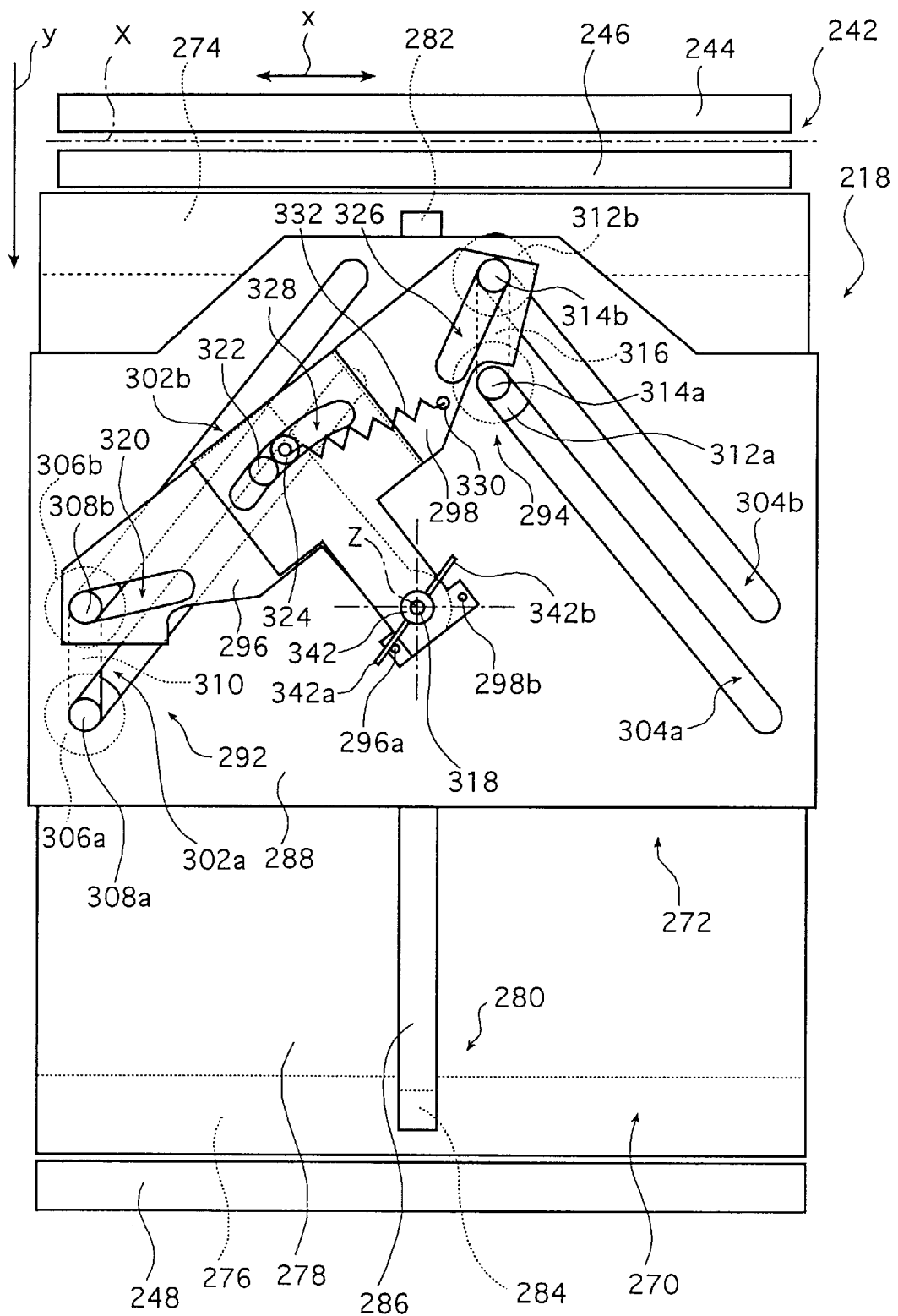
FIG. 9 is a diagrammatic plan view of the light-sensitive material distributing device shown in FIG. 8.

FIG. 8 is a side view of the distributing device 218 and FIG. 9 is a plan view, with part taken away, of the same device. The distributing device 218 comprises basically belt conveyors 270 and a lift transport mechanism 272 serving as a lift distributing means. The light-sensitive material A exposed in the image recording section 216 is ejected onto the belt conveyors 270, which carry the exposed light-sensitive material A to a specified position, whereupon it is lifted by the lift transport mechanism 272 and transported obliquely downstream to be set aside to either right or left; the light-sensitive material A is replaced on the belt conveyors 270 and transported as such to be fed through the transport roller pair 248.

The distributing device 218 having the above-described construction is provided immediately downstream of the image recording section 216 (particularly the scanning transport means 242 in it) which performs exposure on a center basis and which coincides with the distributing device 218 in terms of the center in a transverse (main scanning) direction (which is hereinafter referred to simply as the "center").

The belt conveyors 270 transport the light-sensitive material A as it is placed on them. On the other hand, the scanning transport means 242 and the transport roller pair 248 which feeds the light-sensitive material A into the processor 250 (or the transport means in the processor 250) typically transports the light-sensitive material A as it is held between two members.

Therefore, even if part of the light-sensitive material A in the process of exposure is ejected from the scanning transport means 242 to be replaced on the belt conveyors 270, the transport speed of the light-sensitive material A is governed by the scanning transport means 242 and any difference that may occur between the travelling speed of the belt conveyors 270 and the scanning transport speed will in no way affect the speed at which the light-sensitive material A being exposed is transported for scanning; hence, the distributing device 218 can be provided immediately after the scanning transport means 242.

If the light-sensitive material A is released from the scanning transport means 242, it is transported by the belt conveyors 270 at their speed of travel to be fed through the transport roller pair 248. The travelling speed of the transport roller pair 248 which performs processor entry of the light-sensitive material A is equal to the transport speed in the processor 250 and typically slower than the travelling speed of the belt conveyors 272 and the like in the recording apparatus 210. However, if the transport of the light-sensitive material A to the transport roller pair 248 is performed by the belt conveyors 270, its transport speed at the point of time when it has been held between the two members of the transport roller pair 248 is governed by that roller pair and, hence, the exposed light-sensitive material A can be supplied into the processor 250 in a smooth and safe manner.

In addition, the lift transport mechanism 272 lifts individual sheets of the light-sensitive material A on the belt conveyors 270 and carries them laterally to set them aside to either right or left; hence, sheets of the light-sensitive material A can be rapidly distributed (or transported for their distribution) without being constrained by the travelling speed of the belt conveyors 270 and other factors. As a further advantage, a sheet of the light-sensitive material A that has been already transported onto the belt conveyors 270 is lifted in preparation for being set aside and, hence, will not interfere with the transportation of the next coming sheet of the light-sensitive material A onto the belt conveyors 270. As a result, sheets of the light-sensitive material A emerging from the scanning transport means 242 can be successively received by the belt conveyors 270 for distribution into a plurality of rows.

Briefly, the light-sensitive material distributing device of the present invention is such that the belt conveyors 270 for transporting the light-sensitive material A as it is placed on them is combined with the lift distributing means which lifts individual sheets of the light-sensitive material and distributes them into a plurality of rows. As a result, the heretofore required high-speed transport section and speed-regulating section are obviated and the distributing device is generally straight and of short length in the transport path to realize a smaller size, a simpler construction at a lower cost. This device can transport the light-sensitive material A from the recording section 216 to the processor 250 in a smooth and consistent manner without affecting the transport of the light-sensitive material A for scanning and its transport through the processor 250 and, what is more, individual sheets of the light-sensitive material A can be positively distributed into a plurality of rows as they travel from the recording section 216 to the processor 250.

Each of the belt conveyors 270 is of a known type that comprises two rollers 274 and 276, an endless belt 278 stretched between the two rollers, and a drive source which is not shown in FIG. 8.

In the recording apparatus 210, the distance from the scanning transport means 242 (particularly the transport roller pair 246) to the transport roller pair 248 depends on and must be greater than the length of a print that has the largest size in the direction of transport of all the prints to be handled by the recording apparatus 210; therefore, the position and transport length of each belt conveyor 270 are set at such values that depending on the distance between the scanning transport means 242 and the transport roller pair 248, the light-sensitive material A can be transported from the former to the latter in a consistent manner. If the distance between the scanning transport means 242 and the transport roller pair 248 is too long, the overall pathlength increases to eventually increase the equipment cost and size; this another consideration that must be included in determining the distance between the scanning transport means 242 and the transport roller pair 248.

The lateral size (width) of each belt conveyor 270 depends on various factors such as the maximum print size across width and the number of rows into which sheets of the light-sensitive material are to be distributed and a suitable value may be selected that ensures consistent and positive transport of the light-sensitive material A.

In the illustrated distributing device 218, the belt conveyors 270 are inclined to slope downward in the direction of transport of the light-sensitive material A. This is a preferred embodiment in that the occurrence of troubles such as jamming of the light-sensitive material A due to the curl it usually possess and its buckling are effectively prevented to ensure that the distributing device 218 can accept the light-sensitive material A from the scanning transport means 242 and supply it into the processor 250 in a more smooth and consistent manner.

The angle by which the belt conveyors 270 incline downward is not limited to any particular value, except that if it is too large, the light-sensitive material A will not stay on the belt conveyors 270 but just slide down; therefore, the inclination of the belt conveyors 270 is preferably between about 5 and 30 degrees.

The travelling speed of the belt conveyors 270 may be determined as appropriate depending upon such factors as the throughput of the recording apparatus 210 and the scanning transport speed. Preferably, the travelling speed of the belt conveyors 270 is slightly higher than the scanning transport speed in order to ensure that any effect that may be caused on the transport of the light-sensitive material A for scanning when it is placed on (brought into contact with) the belt conveyors 270 can be eliminated more positively.

Specifically, considering the variations in the scanning transport speed, the stability of transport by the belt conveyors 270 and other factors, the travelling speed of the belt conveyors 270 is preferably 2–10% faster than the scanning transport speed.

In the illustrated distributing device 218, each belt conveyor 270 has above it a less wide auxiliary belt conveyor 280 that runs along its center line. The auxiliary belt conveyor 280 comprises rollers 282 and 284 and an endless belt 286 stretched between the two rollers. The auxiliary belt conveyor 280 is driven at the same speed as the underlying belt conveyor 270.

The auxiliary belt conveyor 280 does not cooperate with the underlying belt conveyor 270 to transport the light-sensitive material A as it is held between the two conveyors; rather, the auxiliary belt conveyor 280 is spaced from the belt conveyor 270 by a certain distance. Thus, the primary function of the auxiliary belt conveyor 280 is to depress any curl of the light-sensitive material A, thereby ensuring that the light-sensitive material A is positively transported by the belt conveyor 270 and sucked in position by the lift transport mechanism 272 while, at the same time, the consistency in the entry of the light-sensitive material A into the processor is improved.

The clearance between the belt conveyor 270 and the auxiliary belt conveyor 280 is not limited to any particular value. However, if the clearance is unduly small, the transport for scanning of the light-sensitive material A during exposure is adversely affected and, in addition, the light-sensitive material A will travel at an angle with the center line (cannot run straight). Conversely, if the clearance is excessive, there is no sense in providing the auxiliary belt conveyor 280 and the consistency in the entry of the light-sensitive material A into the processor will in no way be improved. Considering these facts, the clearance between the belt conveyor 270 and the auxiliary belt conveyor 280 is preferably set at between about 4 and 20 mm.

The lift transport mechanism 272 comprises the following basic components: a lower substrate 288, an upper substrate 290 (not shown in FIGS. 9–12), a first sucker unit 292 and a second sucker unit 294 which are positioned symmetrically with respect to the center line, i.e., the auxiliary belt conveyor 280, in such a way that the first sucker unit is on the right side of the direction of transport indicated by arrow y (the term "right side" as used hereinafter has this meaning) and the second sucker unit on the left side, a first paddle 296 in engagement with the first sucker unit 292, a second paddle 298 in engagement with the second sucker unit 294, and drive means 300 for pivoting the two paddles (the drive means 300 is not shown in FIGS. 9–12).

In the distributing device 218, either of the two sucker units in the lift transport mechanism 282 is turned on to suck the light-sensitive material A in position and by allowing the first sucker unit 292 on the right side to move obliquely to the right and outwardly in a downstream direction and the second sucker unit 294 on the left side to move obliquely to the left and outwardly in a downstream direction, sheets of the light-sensitive material A are transported sidewise to be distributed into two or three rows.

The lower substrate 288 and the upper substrate 290 serve as boards along which the first sucker unit 292 and the second sucker unit 294 will move; having this function, the two substrates are basically the same in planar shape and spaced apart and held to be fixed parallel to each other by known means using spacers, stays and so forth.

Each of the lower substrate 288 and the upper substrate 290 is provided with a pair of long guide slots 302a and 302b that extend in the direction of transport of the light-sensitive material A by means of the lift transport mechanism 272 and which guide the first sucker unit 292 on the right side, as well as another pair of long guide slots 304a and 304b that also extend in the direction of transport of the light-sensitive material A by the lift transport mechanism 272 and which guide the second sucker unit 294 on the left side.

As will be described later, each sucker unit has two suckers arranged in the direction of transport of the light-sensitive material A by the belt conveyor 270 and the two guide slots in each sucker unit correspond to the respective suckers. Hence, the guide slots 302a and 302b, as well as guide slots 304a and 304b are formed parallel to each other such that they are spaced apart in the direction of transport of the light-sensitive material A by the belt conveyor 270 but being in registry in their lateral position. In the illustrated case, guide slots 302 and 304 are formed symmetric with respect to the center line.

The slots in the illustrated case are not the sole example of the means of guiding and moving the sucker units and may be replaced by guide rails, pipes and so forth to guide the sucker units.

Aside from the components mentioned above, the lower substrate 288 and the upper substrate 290 have holes, members and the like to serve as markers of various functional parts of the drive means 300.

The first sucker unit 292 for distributing sheets of the light-sensitive material A by transporting them obliquely to the right in a downstream direction comprises suckers 306a and 306b, retainer shafts 308a and 308b, and a linking member 310. The second sucker unit 294 for distributing sheets of the light-sensitive material A by transporting them obliquely to the left in a downstream direction comprises suckers 312a and 312b, retainer shafts 314a and 314b, and a linking member 316.

As already mentioned, the lift transport mechanism 272 uses the two sucker units to suck sheets of the light-sensitive material A in position and transport them to both right and left so that they are distributed in a plurality of rows. Therefore, the width of the aforementioned auxiliary belt conveyor 280 and the positions of the guide slots 302 and 304 in their lateral direction on an upstream end are set in such a way that the light-sensitive material A in the form of cut sheets of a minimum size to be distributed can be sucked by means of the suckers in each sucker unit. In addition, exposure of the light-sensitive material A is performed on a center basis and the two sucker units are positioned on opposite sides of the auxiliary belt conveyor 280 which extends on the c enter line; as a result, the first sucker unit 292 will suck the right-hand side of the light-sensitive material A in position whereas the second sucker unit 294 will suck the left-hand side.

Except for the position in which they are provided, the two sucker units have basically the same construction, so the first sucker unit 292 will be described below as a representative case.

The retainer shaft 308a (or 314a) is retained in the guide slot 302a (or 304a) in the lower substrate 288 and the upper substrate 290 by any known means such that it is free to move in the direction in which the guide slot 302a (or 304a) extends. Similarly, the retainer shaft 308b (or 314b) is retained in the guide slot 302b (or 304b) in the substrates by any known means such that it is free to move in the direction in which the guide slot 302b (or 304b) extends. Thus, each sucker unit is guided by the corresponding guide slots to move in the direction of transport of the light-sensitive material A.

The sucker 306a (or 312a) is retained at the lower end of the retainer shaft 308a (or 314a) such that it can be raised or lowered and the sucker 306b (or 312b) is retained at the lower end of the retainer shaft 308b (or 314b) such that it can be raised or lowered. A suction hose (not shown) connected to a vacuum pump or the like is connected to the upper end of each retainer shaft 308 for allowing each sucker 306 to suck the light-sensitive material A in position.

Suckers 306a and 306b (or 312a and 312b) are coupled by the linking member 310 (or 316) so that they are fixed together as they are arranged in the direction of transport of the light-sensitive material A by the belt conveyor 270; this is how the first sucker unit 292 is composed.

The first sucker unit 292 is equipped with vertical moving means, or means of raising or lowering the suckers 306a and 306b so that the light-sensitive material A can be sucked up. The means of raising or lowering the suckers 306 is not limited to any particular type and an exemplary means may be as follows: both suckers 306 are urged upward by springs or some other suitable means so that they are retained on the retainer shafts 308; the linking member 310 shaped to be convex upward in the center and an air cylinder or like means that depresses the underside of the lower substrate 288 is provided on top of the linking member 310 and the suckers 306 are lifted if the cylinder or like means depresses the underside of the lower substrate 288; otherwise, the suckers are lowered.

This is not the sole means of raising or lowering the suckers in the distributing device of the invention and other methods that can be employed are as follows: a method in which each sucker is fixed to a support shaft, which is raised or lowered; a method in which the lower substrate 288 either alone or in combination with the upper substrate 290 is raised or lowered; a method in which belt conveyors 270 (and auxiliary belt conveyors 280) are raised or lowered; and a method in which a fulcrum is provided in a position distant from each sucker (sucker unit) so that suckers (or sucker units) can be raised or lowered by oscillation or a pivoting action. Aside from cylinders, a cam or link mechanism may be employed as a drive source of raising or lowering suckers.

The first paddle 296 and the second paddle 298 are provided on top of the lower substrate 288. The two paddles are plates that are supported on a support shaft 318 having a center Z coinciding with the center in a lateral direction (on the center line of transport of the light-sensitive material A) and which are pivotal independently of each other; the paddles are also urged by a spring 132 to be described later in such a direction that they come closer to each other.

As shown in FIG. 9, a slot 320 is formed near the end of the first paddle 296 which is remote from the second paddle 298. The retainer shaft 308b is passed through the slot 320 so that the shaft is in engagement with the slot and can move along to bring the first sucker unit 292 on the right side into engagement with the first paddle 296. A rod of stopper 322 is fixed on the top surface of the first paddle 296 near the end close to the second paddle 298 and an engaging member 324 is fixed outward of the stopper 322. A rod of pin 296a is fixed perpendicular to the first paddle 296 in a position which is near the support shaft 318 but where the first paddle 296 does not overlap the second paddle 298.

A slot 326 is formed near the end of the second paddle 298 which is remote from the first paddle 296. The retainer shaft 314b is passed through the slot 326 so that the shaft is in engagement with the slot and can move along to bring the second sucker unit 294 on the left side into engagement with the second paddle 298. A slot 328 is formed near the end of the second paddle 298 which is close to the first paddle 296, and the stopper 322 and the engaging member 324 on the first paddle 296 are passed through the slot 328 such that they are free to move along it. A rod of pin 298b is fixed perpendicular to the second paddle 298 in a position which is near the support shaft 318 and which is remote from the pin 296a on the first paddle 296 with respect to the support shaft 318.

In addition, an engaging member 330 is fixed near end of the second paddle 298 which is remote from the first paddle 296 and a spring 332 is loaded between this engaging member 330 and the other engaging member 324 on the first paddle 296 so that the two paddles are urged in a direction in which they come closer to each other.

Because of the arrangement described above, if the drive means 300 pivots the first paddle 296 counterclockwise, the second paddle 298 is pulled via the spring 332 to pivot in the same direction; on the other hand, if the drive means 300 pivots the second paddle 298 clockwise, the first paddle 296 is pulled via the spring 332 to pivot in the same direction.

The drive means 300 comprises a motor 334 which is a drive source capable of rotation in opposite directions, a gear 336 fixed on the rotating shaft of the motor 334, a speed reducing gear 338 meshing with the gear 336, a gear 340 that meshes with the speed reducing gear 338 and which is axially supported on the support shaft 318, and a cylindrical rotating member 342 that is fixed to the gear 340 and which is axially supported on the support shaft 318 to be rotatable. Through-holes and support shafts that assist in arranging these components of the drive means 300 are provided in or on the upper substrate 290 and the lower substrate 288.

In the illustrated case, the transmission of the rotation of the motor 334 from the gear 336 to the speed reducing gear 338 is accomplished by meshing between the two gears but the same result can be attained by a timing belt stretched between the two gears.

The sidewall of the pivoting member 342 if provided with pivot pins 342a and 342b that extend from a height engageable with the pin 296a on the first paddle 296 and the pin 298b on the second paddle 298 in such a way that they project along an extension of the diameter of the pivoting member 342.

Because of the described above, if the motor 334 is driven to rotate the pivoting member 342 counterclockwise, the pivot pin 432a pushes the pin 296a on the first paddle 296 which, in turn, pivots the first paddle 296 counterclockwise so that the first sucker unit 292 in engagement with the first paddle 296 moves along the guide slots 302. Conversely, if the motor 334 is driven in reverse direction to rotate the pivoting member 342 clockwise, the pivot pin 432b pushes the pin 298b on the second paddle 298 which, in turn, pivots the second paddle 298 clockwise so that the second sucker unit 294 in engagement with the second paddle 298 moves along the guide slots 304.

It should be added that by the action of the spring 332, the paddle that is not driven by the pivoting member 342 is also allowed to pivot in the same direction as the other paddle that has been allowed to pivot by the action of the pivoting member 342.

The movements of the first sucker unit 292 and the second sucker unit 294 will now be described with reference to FIGS. 9–12.

FIG. 9 shows one of the actions the two sucker units perform when sheets of the light-sensitive material A are distributed into three rows, as will be described later more specifically. The first sucker unit 292 is in a position where it has transported the light-sensitive material A and the second sucker unit 294 is in a position where it is ready for sucking and holding in place the light-sensitive material A on the belt conveyor 270 (this position of the second sucker unit is hereinafter referred to as "home position"). When the motor 334 runs to rotate the pivoting member 342 clockwise, the pivot pin 342a, the pin 296a on the first paddle 296 and the spring 332 work in combination to pivot the first paddle 296 clockwise, whereupon the first sucker unit 292 (having the suckers 306a and 306b) in engagement with the slot 320 in the first paddle 296 are guided by the guide slots 302 to move along upstream to the left until the orientation shown in FIG. 10 is reached.

Figure 10:
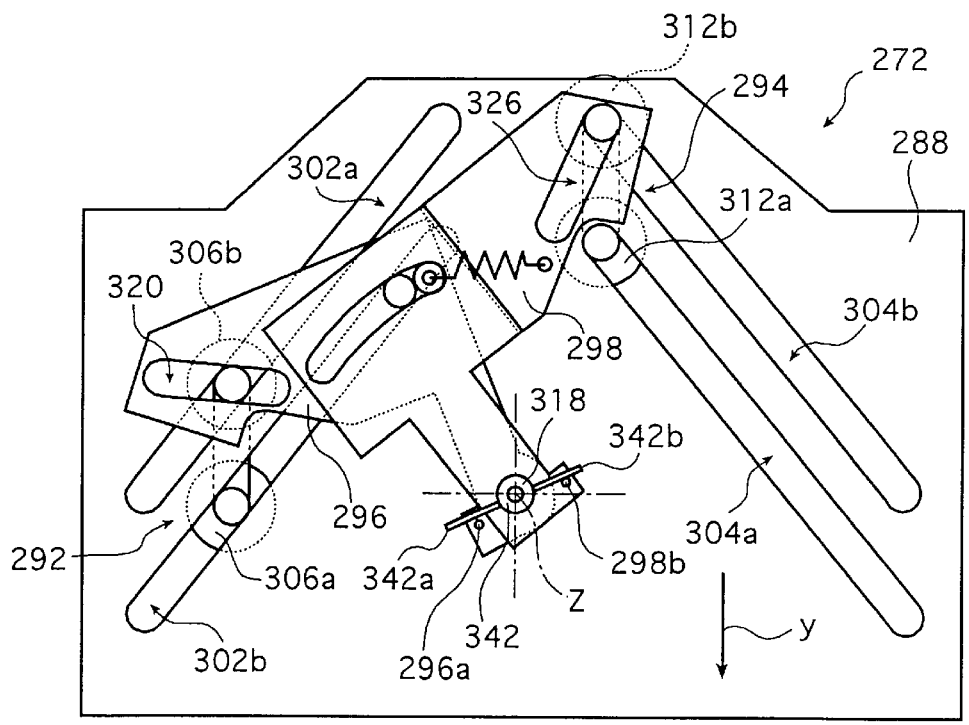
FIG. 10 is a diagrammatic plan view of the lift transport mechanism in the light-sensitive material distributing device shown in FIG. 8.

When the orientation shown in FIG. 10 is reached, the pivot pin 342b engages the pin 298b on the second paddle 298. Upon further clockwise rotation of the pivoting member 342, the pivot pin 342b pushes the pin 298b, causing the second paddle 298 to rotate clockwise. As a result, the second sucker unit 294 (having the suckers 312a and 312b) in engagement with the slot 326 in the second paddle 298 are guided by the guide slots 304 to move along downstream to the left of FIG. 11).

Figure 11:
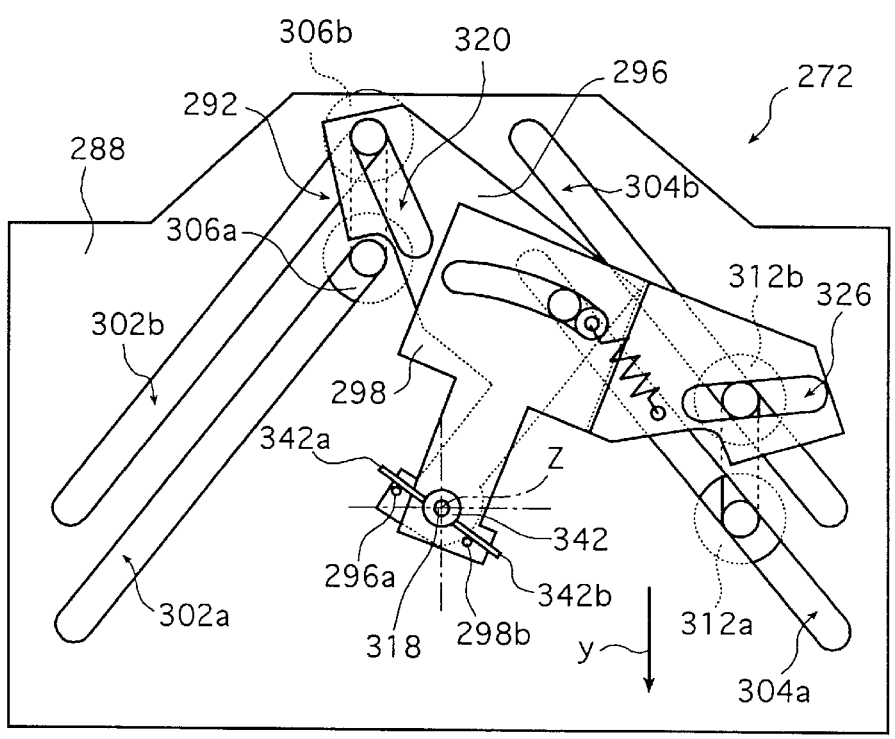
FIG. 11 is a diagrammatic plan view of the same lift transport mechanism which is in a different state than it is shown in FIG. 10.

When the pivot pin 342b engages the pin 298b (as shown in FIG. 10), the first paddle 296 no longer receives the pivoting force transmitted from the pivoting member 342; however, the spring 332 pulls the first paddle 296 toward the second paddle 298 so that it also pivots clockwise and the first sucker unit 292 is guided by the guide slots 302 to move along upstream to the left until the home position shown in FIG. 11 is reached.

Figure 12:
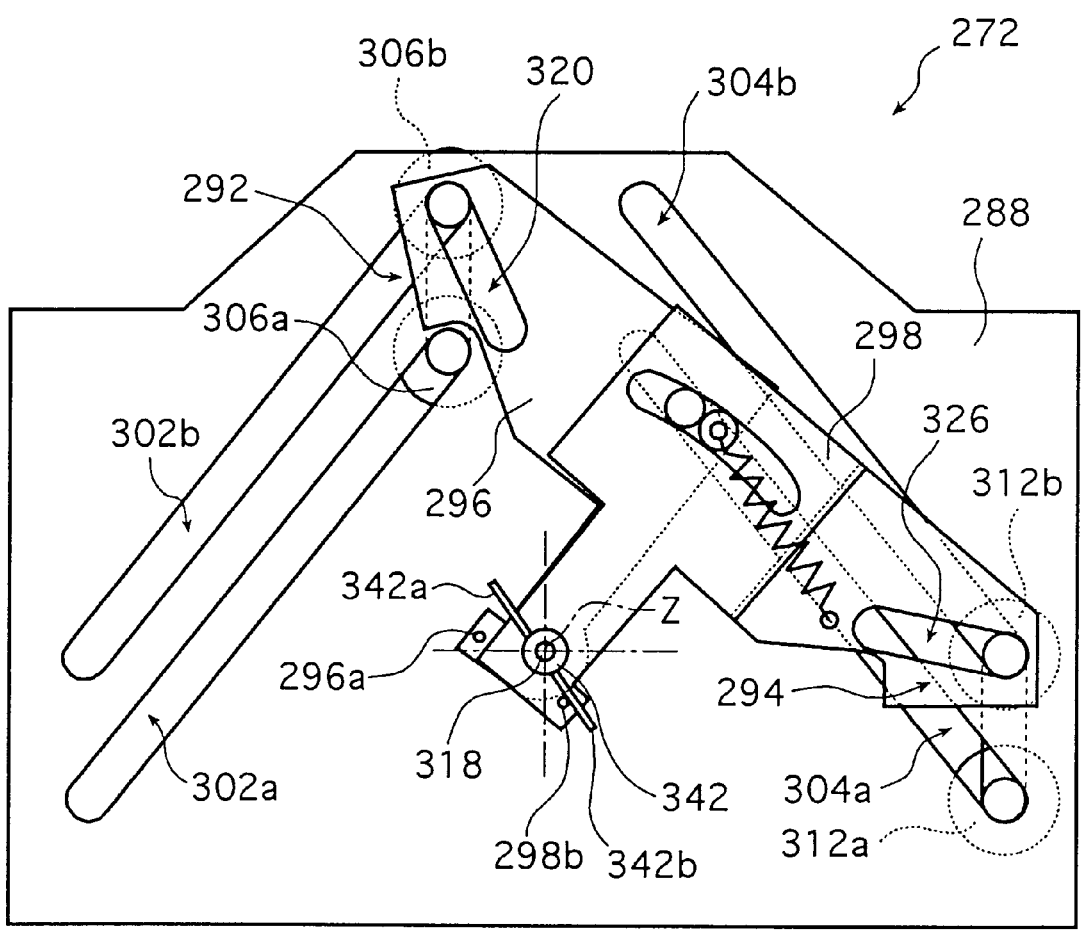
FIG. 12 is a diagrammatic plan view of the same lift transport mechanism which is in a different state than it is shown in FIG. 11.

When the pivoting member 342 further rotates clockwise to pivot the second paddle 298, the second sucker unit 294 is guided by the guide slots 304 to move along downstream to the farthest end as shown in FIG. 12. At this point of time, the motor 334 stops running and the pivoting member 342 no longer pivots. The motor 334 may be controlled by a known method such as pulse control.

When the motor 334 stops, the first sucker unit 292 in the home position is in engagement with the guide slots 302 and makes no further movement but the spring 332 expands in response to the pivoting of the second paddle 298.

After the orientation shown in FIG. 12 was reached, the motor 334 in the drive means 300 is run in reverse direction, whereupon the pivoting member 342 rotates counterclockwise and through the sequence of the actions shown in FIGS. 12, 11, 10 and 9 in that order, the first and second paddles pivot counterclockwise to move the respective sucker units rightward.

Stated specifically, when the pivoting member 342 rotates counterclockwise, the spring 332 and other actuating members cause the second paddle 298 to pivot counterclockwise, causing the second sucker unit 294 to move upstream to the right and pivot pin 342a to engage the pin 296a (see FIG. 11). Upon further rotation of the pivoting member 342, the first paddle 296 pivots, causing the first sucker unit 292 to move downstream to the right, whereas the second paddle 298 is pulled by the spring 332 to come to the home position (see FIG. 10).

Upon further rotation of the pivoting member 342, the first paddle 296 pivots, causing the first sucker unit 292 to move downstream to the farthest end (see FIG. 9), whereupon the motor 334 stops running. The second sucker unit 294 in the home position is in engagement with the guide slots 304 and makes no further movement.

In the illustrated distributing device 218, the first sucker unit 292 and the second sucker unit 294 are moved to the farthest downstream positions shown in FIGS. 9 and 12, irrespective of the number of rows into which sheets of the light-sensitive material A are distributed. However, this is not the sole case of the invention and the following modification may be applied if sheets of the light-sensitive material A are to be distributed in three rows, the two sucker units are moved to the positions shown in FIGS. 9 and 12, but in the case of distributing the sheets into two rows, the two sucker units are moved to the positions shown in FIGS. 10 and 11, namely, up to the point of time when the sucker unit not sucking the light-sensitive material A returns to the home position. This way, the sheets of the light-sensitive material A can be distributed more rapidly.

The amount of movements of the sucker units may be controlled and adjusted by controlling the drive of the motor.

By moving the first and second sucker units in the manner described above, the distributing device 218 using the lift transport mechanism 272 repeats the sidewise transport of the light-sensitive material A, optionally in combination with straight passage of the light-sensitive material without making its sidewise transport, whereby the sheets of the light-sensitive material A are distributed in two or three rows.

Figure 13:
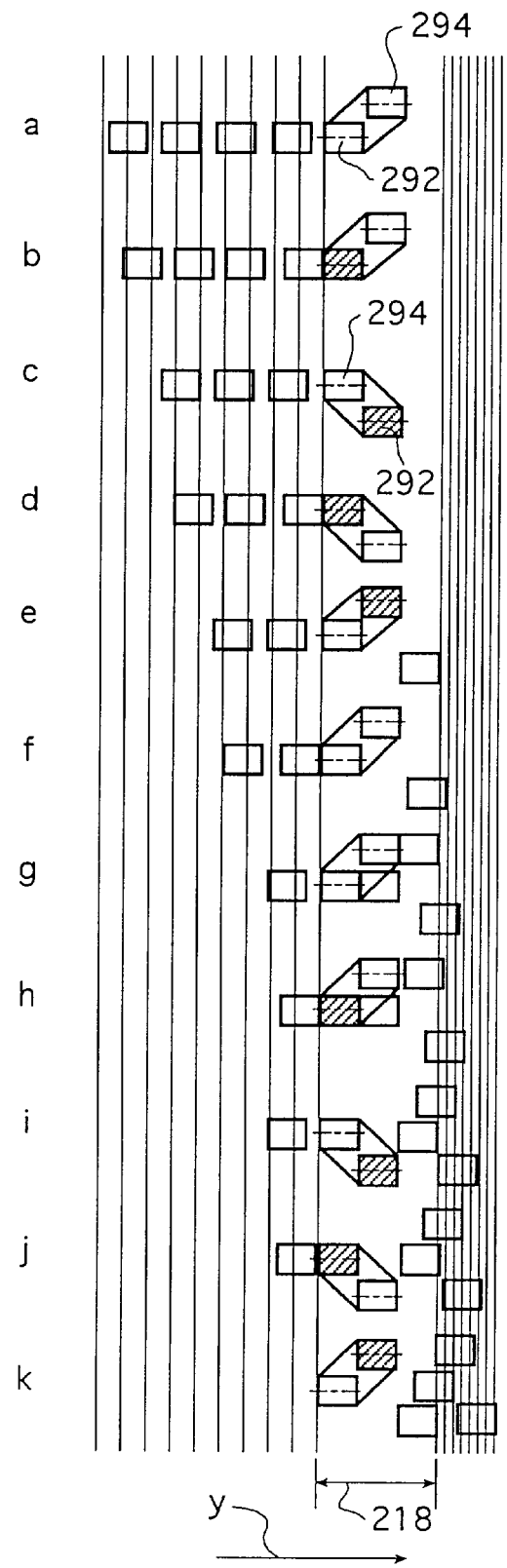
FIG. 13 is a conceptual diagram illustrating one method of distributing sheets of a light-sensitive material using the distributing device shown in FIG. 8.
Figure 14:
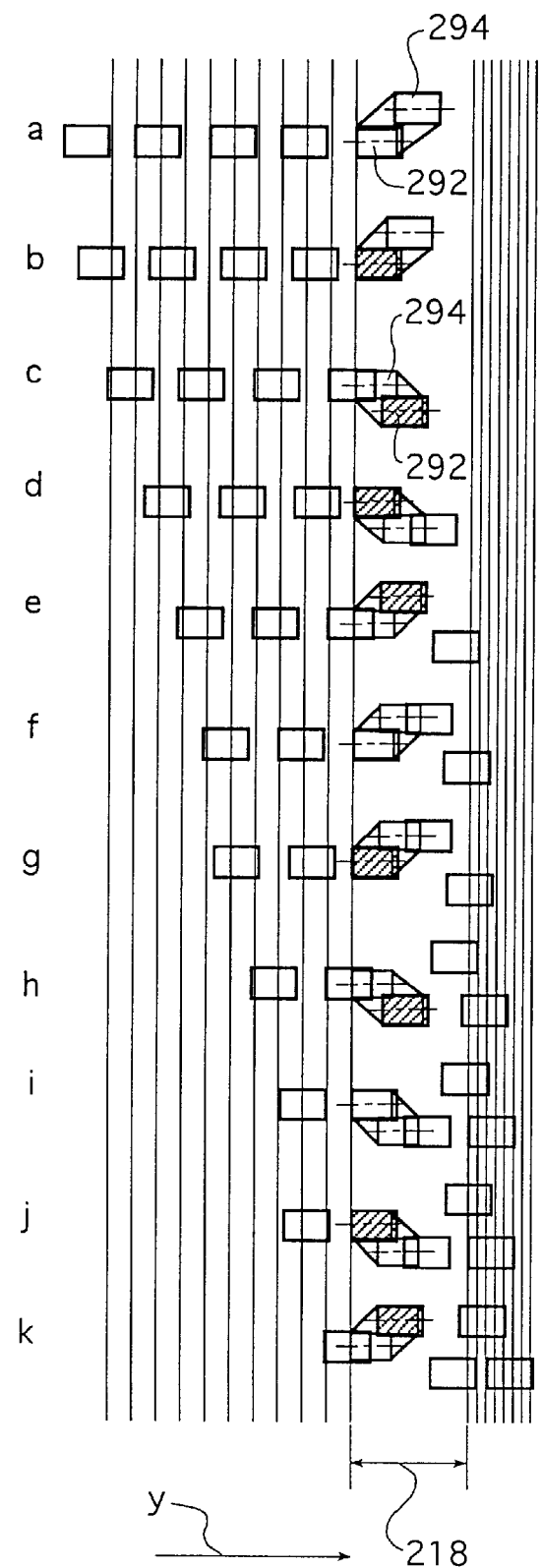
FIG. 14 is a conceptual diagram illustrating another method of distributing sheets of a light-sensitive material using the distributing device shown in FIG. 8.

On the pages that follow, we will describe two specific examples of sheet distribution with reference to FIGS. 13 and 14, in which the distributing device 218 occupies the area indicated by the two-headed arrow, with the image recording section 216 (particularly the scanning transport means 242) being in an upstream position and the transport roller pair 248 in a downstream position to perform entry of the light-sensitive material A into the processor.

The vertical lines in FIGS. 13 and 14 provide a schematic representation of the speeds at which the light-sensitive material A is transported in zones upstream and downstream of the distributing device 218. To give a specific example, the vertical lines in the zone upstream of the distributing device 218 are spaced apart by a distance of 80 mm in correspondence with the scanning transport speed of 80 mm/sec, whereas the vertical lines in the zone downstream of the distributing device 218 are spaced apart by a distance of 28.3 mm in correspondence with the transport speed of the transport roller pair 248 (or processor 250), which is 28.3 mm/sec. Hence, the light-sensitive material A is transported from one vertical line to another per second.

In the illustrated case, the travelling speed of the belt conveyor 270 in the distributing device 218 is 84 mm/sec and the transport length is 15 inches in correspondence with a wide version of 10×12 inch size (254×381 mm). In other words, the recording apparatus is capable of handling prints up to a wide version of 10×12 inch size.

In FIGS. 13 and 14, the first sucker unit 292 and the second sucker unit 294 are each represented by a rectangle in which a one-long-and-one-short dashed line is shown to pass through the center; an individual sheet of the light-sensitive material A is represented by an open rectangle; and the sucker unit sucking the light-sensitive material in place is hatched.

In FIGS. 13 and 14, the first sucker unit 292 and the second sucker unit 294 are shown to have the same home position; however, as already mentioned, the two sucker units are actually positioned on opposite sides of the center line and their home positions are symmetric with respect to the center line.

FIG. 13 shows diagrammatically how the distributing device 218 distributes sheets of the light-sensitive material A into three rows. If prints of a common size are to be produced continuously with the illustrated recording apparatus 210, sheets of the light-sensitive material A are exposed at an approximate rate of one sheet in every two seconds (each sheet passes by the exposing point at that rate) and, thereafter, the exposed sheets are distributed into three rows and supplied into the processor 250.

In the case shown in FIG. 13, the process starts with the first sucker unit 292 being in the home position whereas the second sucker unit 294 has moved downstream to the left (as shown in FIG. 12).

In FIG. 13a, the first coming sheet of light-sensitive material A is transported to a position corresponding to the home position of the first sucker unit 292 (this step is hereinafter referred to as "transport to the home position") Then, the belt conveyor 270 in the distributing device 218 stops and, as shown in FIG. 13b, the vertical moving means turns on to lower the first sucker unit 292 (having the suckers 306a and 306b) to suck the first sheet in place. The vertical moving means then raises the first sucker unit 292 to hoist the first sheet.

Even if the belt conveyor 270 stops, the exposure in the image recording section 216, namely, the transport of the light-sensitive material for scanning (80 mm/sec) by the scanning transport means 242, is performed continuously at a speed corresponding to the speed of exposing one sheet in about two seconds and, hence, as shown in FIGS. 13b and 13d, the distance between the sheet in the home position and the next coming sheet decreases and the advancing end of the next coming sheet reaches the home position but by that point of time, the first coming sheet has already been hoisted to provide a space under which the next sheet can slip; thus, successive sheets of the light-sensitive material A are transported into the distributing device with out causing any adverse effects on the transport of the light-sensitive material for scanning and subsequent distribution of the sheets.

When the first sucker unit 292 rises, the belt conveyor 270 runs and so does the motor 334 to rotate the pivoting member 342 counterclockwise, whereupon the first paddle 296 pivots counterclockwise and, as shown in FIG. 13c, the first sucker unit 292 moves downstream to the right to transport the first sheet of light-sensitive material A and, at the same time, the second sucker unit 294 moves to the home position (as shown in FIG. 9).

By that time, the second sheet of light-sensitive material A has been transported to the home position in the illustrated case; the belt conveyor 270 then stops and the vertical moving means lowers both sucker units and, as shown in FIG. 13d, the first sucker unit 292 releases the first sheet of light-sensitive material A and replaces it on the belt conveyor 270; at the same time, the second sucker unit 294 sucks the second sheet of light-sensitive material A and thereafter both sucker units rise.

Subsequently, the belt conveyor 270 runs and so does the motor 334 to rotate the pivoting member 342 clockwise and, as shown in FIG. 13e, the first sucker unit 292 moves to the home position and the second sucker unit 294 moves downstream to the left to transport the second sheet of light-sensitive material A. In the meantime, the first sheet of light-sensitive material A is transported by the belt conveyor 270 at a speed of 84 mm/sec to reach the transport roller pair 248, from which it is transported at the transport speed in the processor 250 (i.e., 28.3 mm/sec).

Subsequently, the belt conveyor 270 stops and the second sucker unit 294 lowers and, as shown in FIG. 13f, it releases the second sheet of light-sensitive material A and replaces it on the belt conveyor 270; thereafter, the second sucker unit 294 rises and the belt conveyor 270 starts to run.

In order to distribute sheets of the light-sensitive material A into three rows by means of the illustrated distributing device 218, the third sheet coming next is not subjected to any distribution action but simply allowed to pass straight on the center line of the belt conveyor 270 after the first sheet was set aside to the right and the second sheet to the left. Hence, in the cases shown in FIGS. 13e–13g, the first sucker unit 292 makes no action and the third sheet of light-sensitive material A is simply transported by the belt conveyor 270.

When the fourth sheet of light-sensitive material is transported to the home position as shown in FIG. 13g, the belt conveyor 270 stops. Since the travelling speed of the belt conveyor 270 is faster than the scanning transport speed, the third sheet of light-sensitive material A has entirely been displaced from the home position.

Subsequently, as shown in FIG. 13h, the first sucker unit 292 lowers, sucks the fourth sheet of light-sensitive material A and rises, whereupon the belt conveyor 270 starts running and the pivoting member 342 pivots the first paddle 295 counterclockwise; then, as shown in FIG. 13i, the first sucker unit 292 transports the fourth sheet of light-sensitive material A downstream to the right and, at the same time, the second sucker unit 294 moves to the home position. In the meantime, the second and third sheets of the light-sensitive material A reach the transport roller pair 248 and the fifth sheet of light-sensitive material A is transported to the home position.

Although the belt conveyor 270 repeats stops and runs, the difference in travelling speed between the belt conveyor 270 and the transport roller pair 248 (hence, processor 250) will cause successive sheets of the light-sensitive material A to overlap after they entered the processor 250.

The subsequent steps are briefly shown in FIGS. 13j and 13k and in a manner similar to the one described above, the respective sucker units are moved, suck the light-sensitive material A and release it, followed by transport of the light-sensitive material A to the home position and other necessary actions, whereby one sheet is set aside to the right, the next to the left and the third is simply passed straight so that successive sheets of the light-sensitive material A are distributed into three rows.

FIG. 14 shows diagrammatically how the distributing device 218 distributes sheets of the light-sensitive material A into two rows. In the illustrated recording apparatus 210, a typical case is assumed, in which sheets of the light-sensitive material A up to sizes of 102–152 inches are distributed into two rows and supplied into the processor 250. Obviously, consecutive sheets of the light-sensitive material A are spaced apart by a somewhat greater distance than they are in the case of handling sheets of an L size in FIG. 13.

As in the case shown in FIG. 13, the process of distribution shown in FIG. 14 starts with the first sucker unit 292 being in the home position whereas the second sucker unit 294 having moved downstream to the left. When performing two-row distribution in the case shown in FIG. 14, the sucker units are not moved downstream to the farthest ends of guide slots 302 and 304 but only to the positions shown in FIGS. 10 and 11. Hence, at the first stage of the process, the sucker units are oriented in the positions shown in FIG. 11.

When the first sheet of light-sensitive material A is transported to the home position (FIG. 14a), the belt conveyor 270 in the distributing device 218 stops and, as shown in FIG. 14b, the vertical moving means lowers the first sucker unit 292 which, in turn, sucks the first sheet of light-sensitive material A and holds it in place; then, the first sucker unit 292 rises to hoist the first sheet of light-sensitive material A.

When the first sucker unit 292 rises, the belt conveyor 270 restarts to run and, at the same time, the motor 334 runs to rotate the pivoting member 342 counterclockwise and, as shown in FIG. 14c, the first sucker unit 292 moves downstream to the right and transports the first sheet of light-sensitive material A whereas the second sucker unit 294 moves the home position (as shown in FIG. 10).

When these movements of the first and second sucker end, the belt conveyor 270 stops and the first sucker unit 292 lowers to release the first sheet of light-sensitive material A so that it is replaced on the belt conveyor 270; thereafter, the first sucker unit 292 rises and the belt conveyor 270 starts to run.

When the second sheet of light-sensitive material A is transported to the home position, the belt conveyor 270 stops and, as shown in FIG. 14*d,* the second sucker unit 294 lowers to suck the second sheet of light-sensitive material A; the second sucker unit 294 then rises and the belt conveyor 270 starts to run.

Subsequently, the motor 134 runs to rotate the pivoting member 342 clockwise and, as shown in FIG. 14*e,* the second sucker unit 294 moves downstream to the left and transports the second sheet of light-sensitive material A, whereas the first sucker unit 292 moves to the home position.

When these movements of the first and second sucker units end, the belt conveyor 270 stops and the second sucker unit 294 lowers to release the second sheet of light-sensitive material A and replace it on the belt conveyor 270; the second sucker unit 294 then rises and the belt conveyor 270 starts to run and, as shown in FIG. 14*f,* the third sheet of light-sensitive material A is transported to the home position.

When the third sheet of light-sensitive material A is transported to the home position, the belt conveyor 270 stops and, as shown in FIG. 14*g,* the first sucker unit 292 sucks the third sheet in place and rises, whereupon the belt conveyor 270 starts to run; then, as shown in FIG. 14*h,* the pivoting member 342 rotates counterclockwise and the first sucker unit 292 transports the third sheet downstream to the right, whereas the second sucker sheet 294 moves to the home position.

The subsequent steps are briefly shown in FIGS. 14*i*–14*k,* in which in accordance with the transport of successive sheets of the light-sensitive material A to their home position, the belt conveyor 270 makes stops and restarts, the respective sucker units move, suck the sheets of light-sensitive material A and release them so that the process of setting aside one sheet to the right and the next sheet to the left is repeated to eventually distribute all sheets of the light-sensitive material A into two rows. As in the case of three-row distribution, the difference in travelling speed between the belt conveyor 270 and the transport roller pair 248 will cause successive sheets of the light-sensitive material A to overlap after they have entered the processor 250.

As will be apparent from the foregoing description, the illustrated method of the invention for distributing sheets of the light-sensitive material uses two sucker units, which are alternatively put into action in such a way that transport of the first sheet with one sucker unit is simultaneously accompanied by movement of the other sucker unit to the home position, thus making the necessary preparation for sucking the next transported sheet in place; in addition, as already mentioned, the first coming sheet has been hoisted for distribution purposes and will in no way interfere with the transport of the second sheet to the home position. As a result, even if successive sheets of the light-sensitive material A need be distributed rapidly and continuously in order to meet strict requirements such as exposing one sheet in about two seconds, the incoming sheets can be accepted in succession without affecting transport of the light-sensitive material for scanning and other operations to be performed in zones upstream of the distributing device and the successive sheets can be distributed into two or three rows in a rapid and positive manner before entry into the processor 250.

In addition, to accomplish the distribution of sheets of the light-sensitive material A using the two sucker units, the illustrated device employs only one motor and a simple mechanism using sucker unit guiding plates and two paddles; as a further advantage, the width of distribution can be easily changed by controlling the drive of the motor.

In the cases described above, the suction and release of the light-sensitive material A by means of the sucker units are performed with the belt conveyor 270 brought to a stop in order to ensure more positive operations. However, this is not the sole case of the invention and, if mechanism permits, the belt conveyor 270 may keep running when the light-sensitive material A is sucked or released.

As already mentioned, the transport by the belt conveyor 270 is faster than that by the transport roller pair 248 which performs processor entry. In the foregoing cases, this speed difference is sufficient to ensure that successive sheets of the light-sensitive material A entering the processor 250 will overlap satisfactorily and, hence, there is no need to ensure that the sheets of the light-sensitive material A being distributed into a plurality of rows will overlap.

Nevertheless, the greater the overlap of the sheets of the light-sensitive material A that are transported through the processor 250, the higher the throughput of the processor 250. Therefore, the distributing device 218 may be adapted to be such that the sheets of the light-sensitive material A already overlap at the point of time when they have been distributed into a plurality of rows on the belt conveyors 270.

Whichever the case, if finished prints (sheets of the light-sensitive material A that have been developed, dried and otherwise treated) emerge from the processor 250 in such a way that the distance between two consecutive sheets (as measured between their trailing edges if they emerge from the processor 250 as they are held between nip rollers or other pinching means) is too small, it may be difficult to stack the prints in the order of exposure depending on factors such as the composition of the stacker or sorter. Hence, this possibility has to be considered when distributing sheets of the light-sensitive material A into a plurality of rows by means of the distributing device 218.

In the distributing device of the invention, the applicable lift transport means is in no way limited to the lift transport mechanism 272 and various other mechanisms can be employed as long as they can pick up sheets of the light-sensitive material A from the belt conveyors, transport them and distribute them into a plurality of rows. For example, the number of sucker units may be reduced to one or increased to three or more. If desired, a plurality of sucker units may be equipped with independent moving mechanisms.

In addition, the sucker units can be moved both horizontally and vertically by various known methods, such as means of using links, means of using cams, means of using guide rails and pipes, means of using gears, means of using a rack-and-pinion, wrapping connector driving or cylinders, as well as suitable combinations of these means.

The method of distribution also is not limited to the cases described above and successive sheets of the light-sensitive material A may be set aside to either right or left alone; alternatively, the first sheet is set aside to either right or left and the next sheet is simply passed straight so that successive sheets are distributed in a plurality of rows.

If necessary, the sheet of light-sensitive material A that is to be set aside to the right may be transported downstream by one sucker unit over a different distance than is the sheet to be set aside to the left.

It should also be mentioned that not all kinds of light-sensitive material need be distributed in the distributing device 218; if the width of the processor 250 and other design factors are such that sheets larger than a certain size cannot be processed in a plurality of rows or in the case of performing batchwise rather than continuous processing, the successive sheets need not be distributed but may simply be fed into the processor 250 in a single row. In other cases such as processing a mixture of panoramic and L sizes, the distributing device 218 may be controlled in such a way that sheets of a panoramic size are not distributed but simply passed straight.

Further in addition, various modes of distribution may be adopted depending upon such factors as the width of the belt conveyor, the distance it transports the light-sensitive material and the width of the processor; for example, sheets of an L size may be distributed in two rows, sheets of 102–152 inch sizes may be distributed in three rows or even larger sized sheets may be distributed into a plurality of rows.

As already mentioned, the sheets of light-sensitive material A transported by the distributing device 218 are further transported by the transport roller pair 248 into the processor 250, where they are subjected to the necessary steps of processing including color development, bleach-fixing and rinsing, and thereafter dried to produce finished prints, which emerge from the processor.

While the light-sensitive material distributing device according to the second aspect of the invention has been described above in detail, it should be noted that the invention is by no means limited to the foregoing cases and various improvements and modifications may course be made without departing from the scope and spirit of the invention. For example, the illustrated distributing device is provided downstream of the image recording section in order to distribute sheets of the exposed light-sensitive material; however, if the image recording section is of a special type such as one capable of exposing a plurality of sheets simultaneously, the distributing device of the invention may be provided upstream of the image recording section so that unexposed sheets of the light-sensitive material are distributed into a plurality of rows. This alternative approach is equally effective.

As described above in detail, the second aspect of the invention is to provide a light-sensitive material distributing device which is to be used in an image recording apparatus (exposing apparatus) that performs exposure on cut sheets of a light-sensitive material and which feeds the exposed sheets of light-sensitive material into a developing machine and the device is characterized by small size and a simple layout, as well as low cost and positiveness in distributing the exposed sheets of light-sensitive material into a plurality of rows in the image recording apparatus. Besides the reduction in the cost of print preparation due to the improved throughput of the processor, the distributing device of the invention offers the advantage of reducing the cost of the image recording apparatus to a lower level than has been achieved by using the conventional distributing device.

What is claimed is:

1. An image recording apparatus comprising:
    a light-sensitive material supply section having a loader of a magazine for containing a roll of a light-sensitive material in a lightproof case and withdrawing means for withdrawing the light-sensitive material from said magazine;
    a cutter for cutting the light-sensitive material into sheets as it is withdrawn by said withdrawing means;
    an image recording section that is positioned above said light-sensitive material supply section and which has scanning transport means for transporting said cut sheets of light-sensitive material for scanning as they are held in a predetermined recording position, and exposing means by which the light-sensitive material being transported for scanning by said scanning transport means is exposed to recording light modulated in accordance with digital image data;
    transport means which transports the light-sensitive material from said cutter to said scanning transport means in such a way that its recording side faces up in said recording position, which transports the exposed light-sensitive material after exposure to a next step and which is inclined downward to the downstream end of the transport of the light-sensitive material; and
    a back printing section which is provided along the path of transport of the light-sensitive material to record a back print on a non-recording side of the light sensitive material.

2. The image recording apparatus according to claim 1, which further includes distributing means downstream of said image recording section in the direction of transport of the light-sensitive material for distributing the cut sheets of light-sensitive material into a plurality of rows in a direction perpendicular to the direction of transport by said transport means.

3. The light-sensitive material according to claim 1, wherein said lift distributing means shifts the sheets laterally with respect to the direction of transport by said transport means.

4. The image recording apparatus according to claim 2, wherein said distributing means shifts the cut sheets laterally with respect to the direction of transport by said transport means.

5. The image recording apparatus according to claim 2, wherein said distributing means comprises a rotatable turret.

6. The image recording apparatus according to claim 2, wherein said distributing means comprises at least first and second side-by-side conveyors, and at least one pair of opposing part-circular rollers located between said first conveyor and said second conveyor for shifting the cut sheets from said first conveyor to said second conveyer.

7. The image recording apparatus according to claim 6, wherein said conveyors are belt conveyors, and said rollers elevate the cut sheets above the surface of the belt conveyors during said shifting of the cut sheets from said first conveyor to said second conveyer.

8. The image recording apparatus according to claim 2, wherein said distributing means comprises a transport conveyor for transporting the cut sheets, and a first suction device located above said transport conveyor for grasping the cut sheets and shifting their position on said transport conveyor laterally with respect to the direction of transport by said transport conveyor.

9. The image recording apparatus according to claim 8, further comprising a second suction device located above said transport conveyor for grasping the cut sheets and shifting their position on said transport conveyor laterally with respect to the direction of transport by said transport conveyor, said first suction device and said second suction device being located on opposite sides of a center of said transport conveyor for shifting the cut sheets laterally away from said center.

10. A light-sensitive material distributing device for use in an image recording apparatus that exposes a light-sensitive material as sheets of a specified length to record a latent image and which supplies the exposed light-sensitive material after exposure into a developing machine, said device comprising:

- transport means for transporting the sheets of light-sensitive material as they are placed on it; and
- lift distributing means which, after the sheets of the light-sensitive material have been transported to a predetermined position on said transport means, lifts said sheets of the light-sensitive material above the transport means, distributes them into a plurality of rows in a lateral direction perpendicular to the direction of transport by said transport means on said transport means in such a way that one of said sheets is lifted above said transport means, next moved in said lateral direction above said transport means and then placed again on said transport means.

11. The light-sensitive material distributing device according to claim 10, wherein the exposure of the light-sensitive material in said image recording apparatus is scan exposure in which the light-sensitive material is exposed as it is transported by scanning transport means and wherein said transport means is provided immediately downstream of said scanning transport means in the direction of transport of the light-sensitive material.

12. The light-sensitive material distributing device according to claim 11, wherein said transport means is inclined downward to the downstream end of the transport of the light-sensitive material.

13. The light-sensitive material distributing device according to claim 10, wherein said transport means is inclined downward to the downstream end of the transport of the light-sensitive material.

14. The light-sensitive material distributing device according to claim 10, wherein said lift distributing means comprises a first suction device located above said transport means for grasping the sheets and shifting their position on said transport means laterally with respect to the direction of transport by said transport means.

15. The light-sensitive material distributing device according to claim 14, wherein said lift distributing means further comprises a second suction device located above said transport means for grasping the sheets and shifting their position on said transport means laterally with respect to the direction of transport by said transport means, said first suction device and said second suction device being located on opposite sides of a center of said transport means for shifting the cut sheets laterally away from said center.

* * * * *